(12) United States Patent
De Laet

(10) Patent No.: US 8,878,833 B2
(45) Date of Patent: Nov. 4, 2014

(54) SYSTEMS, METHODS, AND APPARATUS FOR RECORDING OF GRAPHICAL DISPLAY

(75) Inventor: Rick De Laet, Snellville, GA (US)

(73) Assignee: Barco, Inc., Duluth, GA (US)

( * ) Notice: Subject to any disclaimer, the term of this patent is extended or adjusted under 35 U.S.C. 154(b) by 1197 days.

(21) Appl. No.: 11/838,791

(22) Filed: Aug. 14, 2007

(65) Prior Publication Data

US 2008/0042923 A1  Feb. 21, 2008

Related U.S. Application Data

(60) Provisional application No. 60/837,911, filed on Aug. 16, 2006.

(51) Int. Cl.
*G06T 1/00* (2006.01)
*G05B 15/02* (2006.01)
*G06F 3/14* (2006.01)

(52) U.S. Cl.
CPC *G06F 3/14* (2013.01); *G05B 15/02* (2013.01); *G06F 3/1454* (2013.01)
USPC .......................................................... 345/418

(58) Field of Classification Search
None
See application file for complete search history.

(56) References Cited

U.S. PATENT DOCUMENTS

| 5,893,053 | A * | 4/1999 | Trueblood ..................... 702/187 |
| 6,314,470 | B1 | 11/2001 | Ward |
| 6,724,385 | B2 * | 4/2004 | Takatsuka et al. ............. 345/427 |
| 6,874,149 | B1 | 3/2005 | Bermudez |
| 6,985,149 | B2 | 1/2006 | Peercy |
| 7,203,946 | B2 | 4/2007 | Johnson |
| 7,450,129 | B2 * | 11/2008 | Ruge ............................. 345/522 |
| 7,769,900 | B1 * | 8/2010 | Chalfin et al. ................ 709/247 |
| 2002/0032751 | A1 * | 3/2002 | Bharadwaj .................... 709/218 |
| 2002/0083217 | A1 | 6/2002 | Ward |
| 2002/0126144 | A1 | 9/2002 | Chenede |
| 2003/0001854 | A1 | 1/2003 | Jade |
| 2003/0212742 | A1 * | 11/2003 | Hochmuth et al. ........... 709/204 |
| 2004/0010622 | A1 | 1/2004 | O'Neill |
| 2004/0061703 | A1 * | 4/2004 | Chik et al. .................... 345/467 |
| 2004/0179007 | A1 | 9/2004 | Bower |
| 2005/0012754 | A1 * | 1/2005 | Inuzuka et al. ............... 345/555 |
| 2005/0081158 | A1 * | 4/2005 | Hwang ......................... 715/740 |
| 2005/0256950 | A1 * | 11/2005 | Suzuki ......................... 709/223 |
| 2005/0278455 | A1 | 12/2005 | Ichieda |
| 2006/0090123 | A1 | 4/2006 | Denoue |

(Continued)

FOREIGN PATENT DOCUMENTS

| EP | 1020841 A1 | 7/2000 |
| EP | 1320240 A2 | 6/2003 |

OTHER PUBLICATIONS

International Search Report for International Application No. PCT/IB2007/002362 (3 pp.), 2007.

(Continued)

*Primary Examiner* — Daniel Hajnik

(74) *Attorney, Agent, or Firm* — Hartman Patents PLLC

(57) ABSTRACT

Embodiments include systems, methods, and apparatus configured to record (A) protocol requests that specify display operations on a screen image and (B) information copied from a display buffer storing the screen image. Such embodiments may also be configured to record states relating to an appearance of an output of the display operations. In some of these embodiments, the copied information is stored in the form of pseudo-protocol requests.

19 Claims, 30 Drawing Sheets

(56) References Cited

U.S. PATENT DOCUMENTS

| | | |
|---|---|---|
| 2006/0159080 A1 | 7/2006 | Mazzaferri |
| 2006/0159432 A1 | 7/2006 | Mazzaferri |
| 2006/0161555 A1 | 7/2006 | Mazzaferri |
| 2006/0161671 A1 | 7/2006 | Ryman |
| 2006/0161959 A1 | 7/2006 | Ryman |
| 2006/0170706 A1* | 8/2006 | Hoffman et al. .............. 345/629 |
| 2007/0106810 A1 | 5/2007 | Ryman |
| 2007/0211065 A1* | 9/2007 | Feth et al. .................... 345/522 |

OTHER PUBLICATIONS

Written Opinion of the International Searching Authority for International Application No. PCT/IB2007/002362 (6 pp.), 2007.

Hughes, DW. U.S. Appl. No. 60/735,962. Media Fusion Remote Access. filed Nov. 14, 2005. 42 pp.

BarcoView, LLC. VPCI5605 User's Manual, P/N 072322B. Oct. 2000. 32 pp.

BarcoView, LLC. PVS Series User's Manual, P/N 072397C. Mar. 2001. 68 pp.

Barco Inc., Display Systems. X Windows X11R6 Specification, P/N 072169H. Jun. 1998. 22 pp.

BarcoView, LLC. PCI Series User's Manual, P/N 072228Q. Oct. 2000. 70 pp.

BarcoView, LLC. Barco PCI Products on the HP-UX 10.20 X11R6 DDX Layer, P/N 072375_E. 2003. 13 pp.

BarcoView. VisonaTM Display Server, Ref. ATC 04-006. Dec. 2004. 2 pp.

Challen, R. Recording Video Without Video Recording for ATC Event Analysis. Journal of Air Traffic Control, Jan.-Mar. 2000, pp. 11-13.

How To: Record Videos of Your Desktop. Last accessed Aug. 14, 2007 at http://wolphination.com/linux/2006/06/30/how-to-record-videos-of-your-desktop. 32 pp.

VirtualGL-0.9-20040825 RPM for i386. Last accessed Aug. 14, 2007 at http://rpmfind.net//linux/RPM/sourceforge/v/vi/virtualgl/VirtualGL-0.9-20040825.i386.html. 2 pp.

Remote 3D and You. Last accessed Aug. 1, 2006 at http://virtualgl.sourceforge.net/background.htm. 6 pp.

8.7 Transferring Images between Client and Server. Last accessed Aug. 14, 2007 at http://tronche.com/gui/x/xlib/graphics/images.html. 1 p.

X-Software X-POSE-X-RECORD Info. Last accessed Aug. 14, 2007 at http://www.x-software.com/en/Products/X-POSE-X-RECORD/info.html. 4 pp.

X-POSE-X-RECORD Manual. Last accessed Aug. 14, 2007 at http://www.x-software.com/en/Products/X-POSE-X-RECORD/Manual/X-POSE-X-RECORD-en.pdf. 92 pp.

* cited by examiner

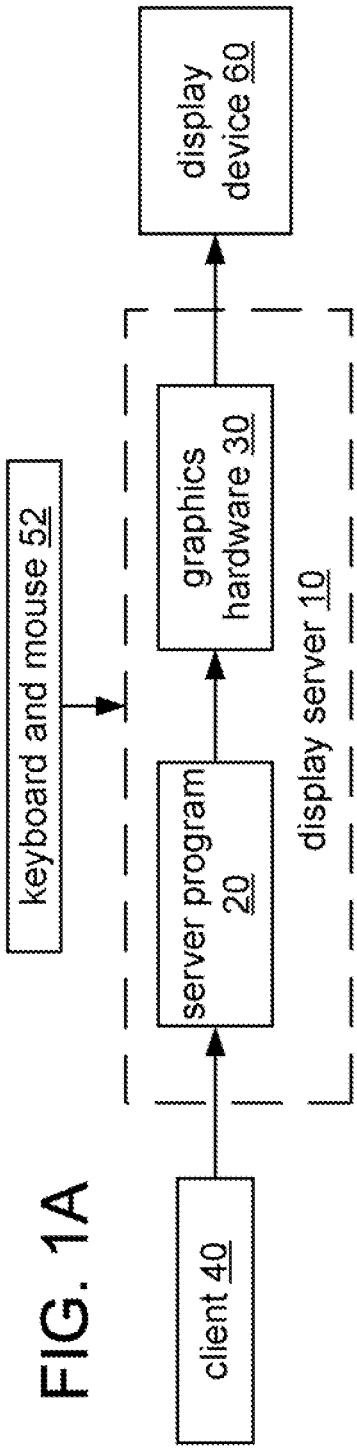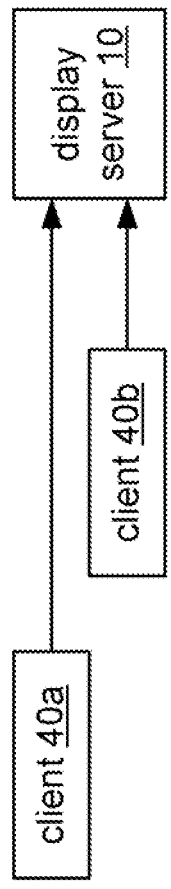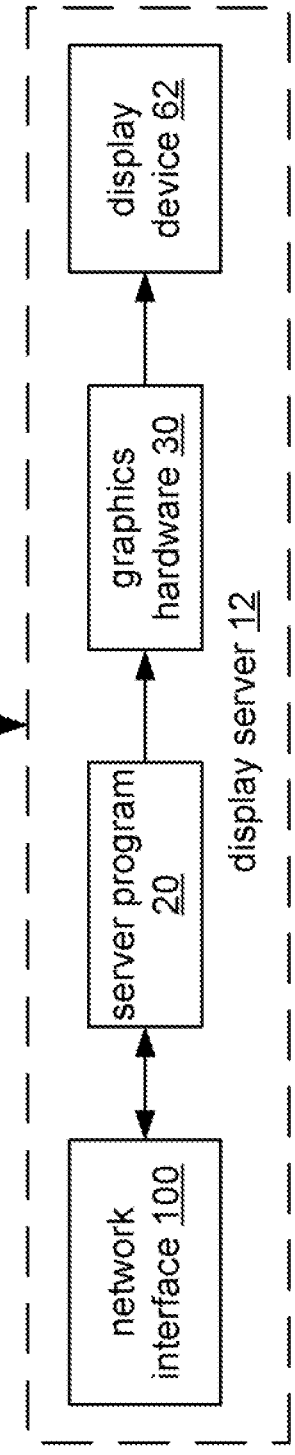

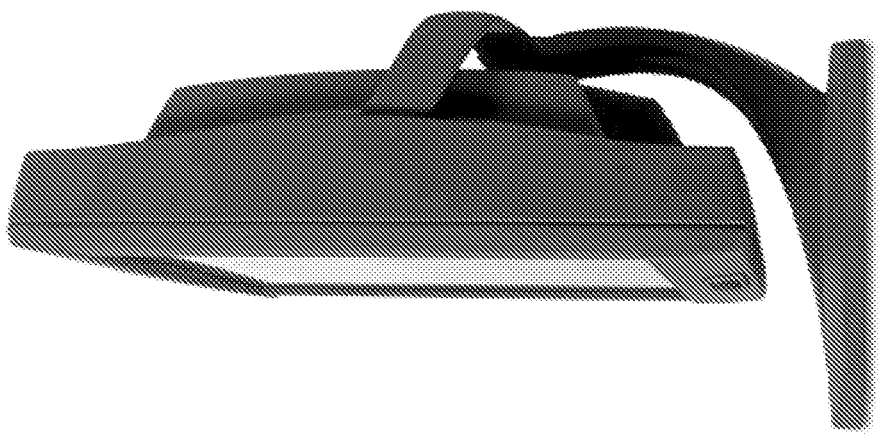
FIG. 3

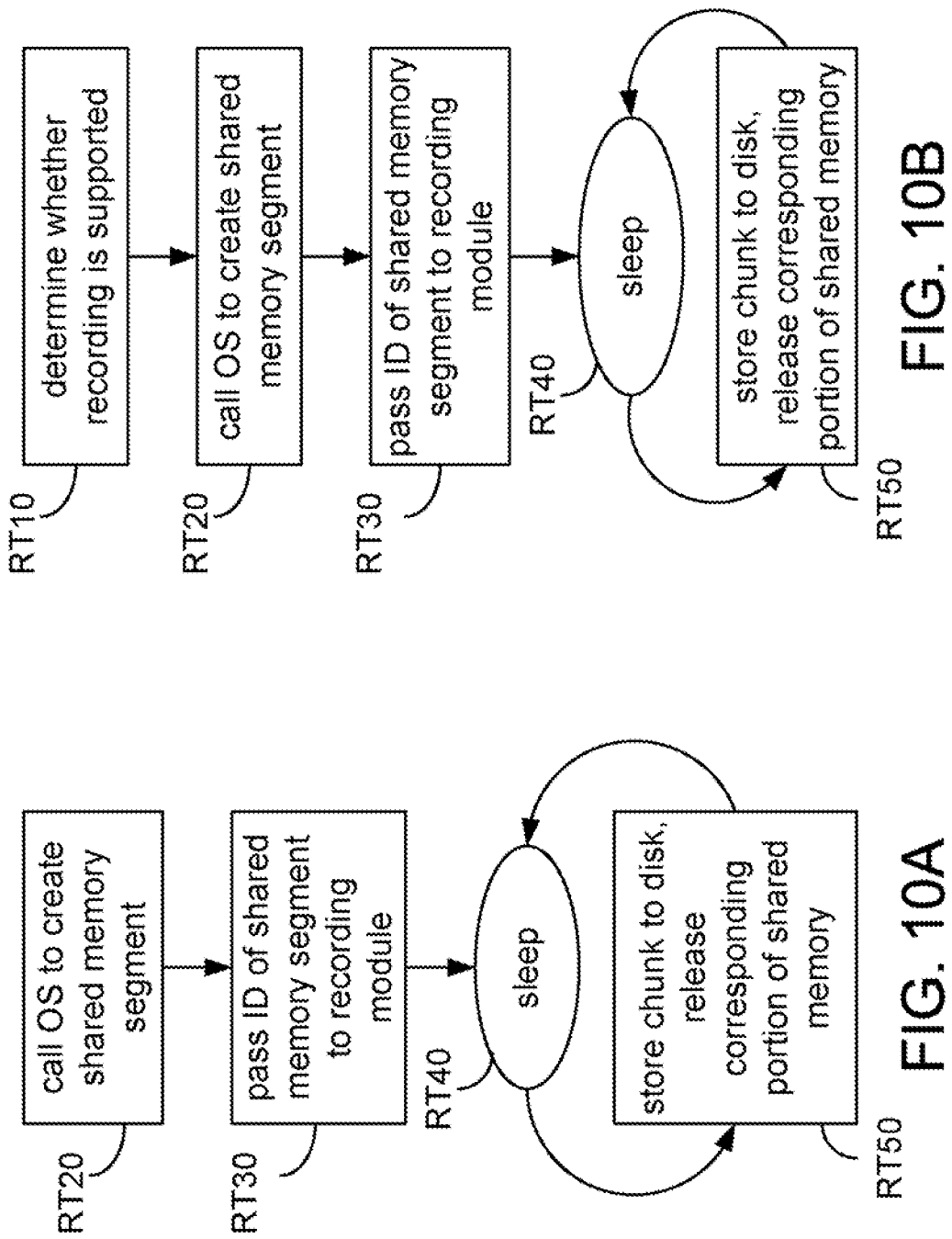

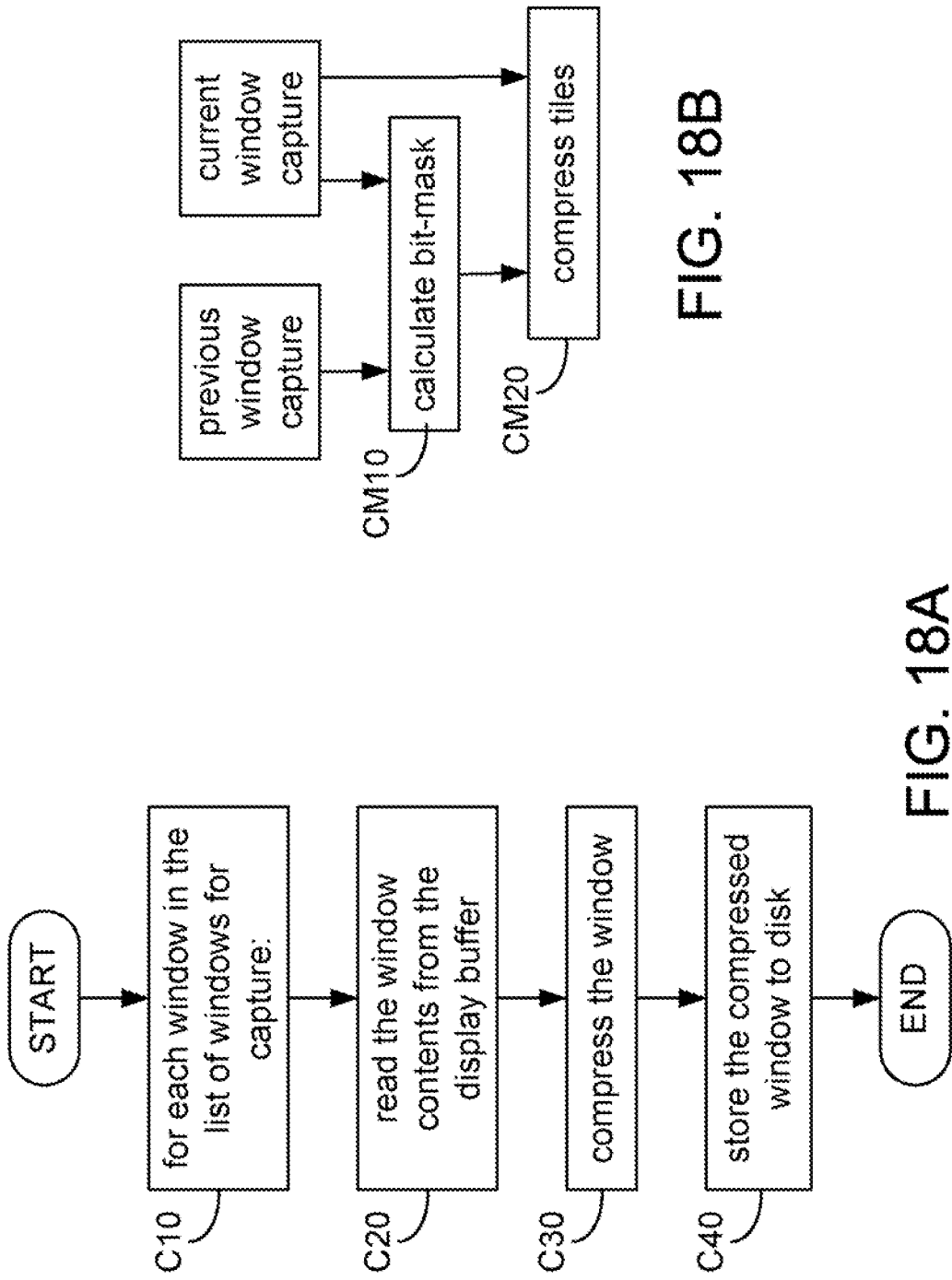

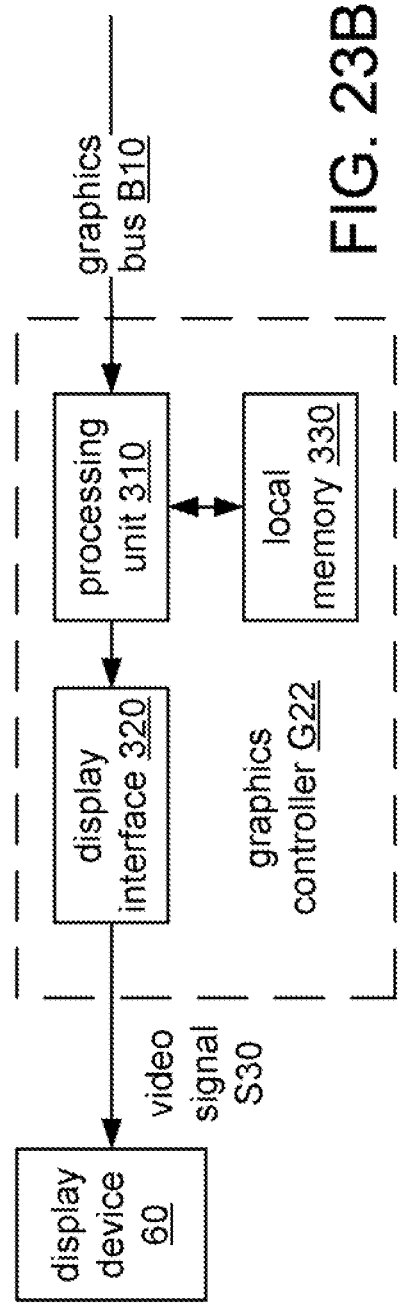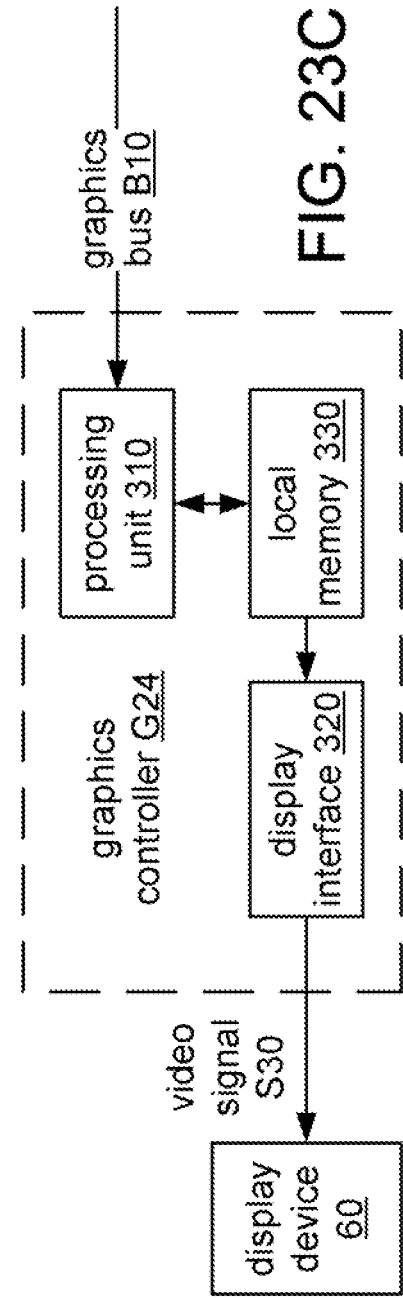

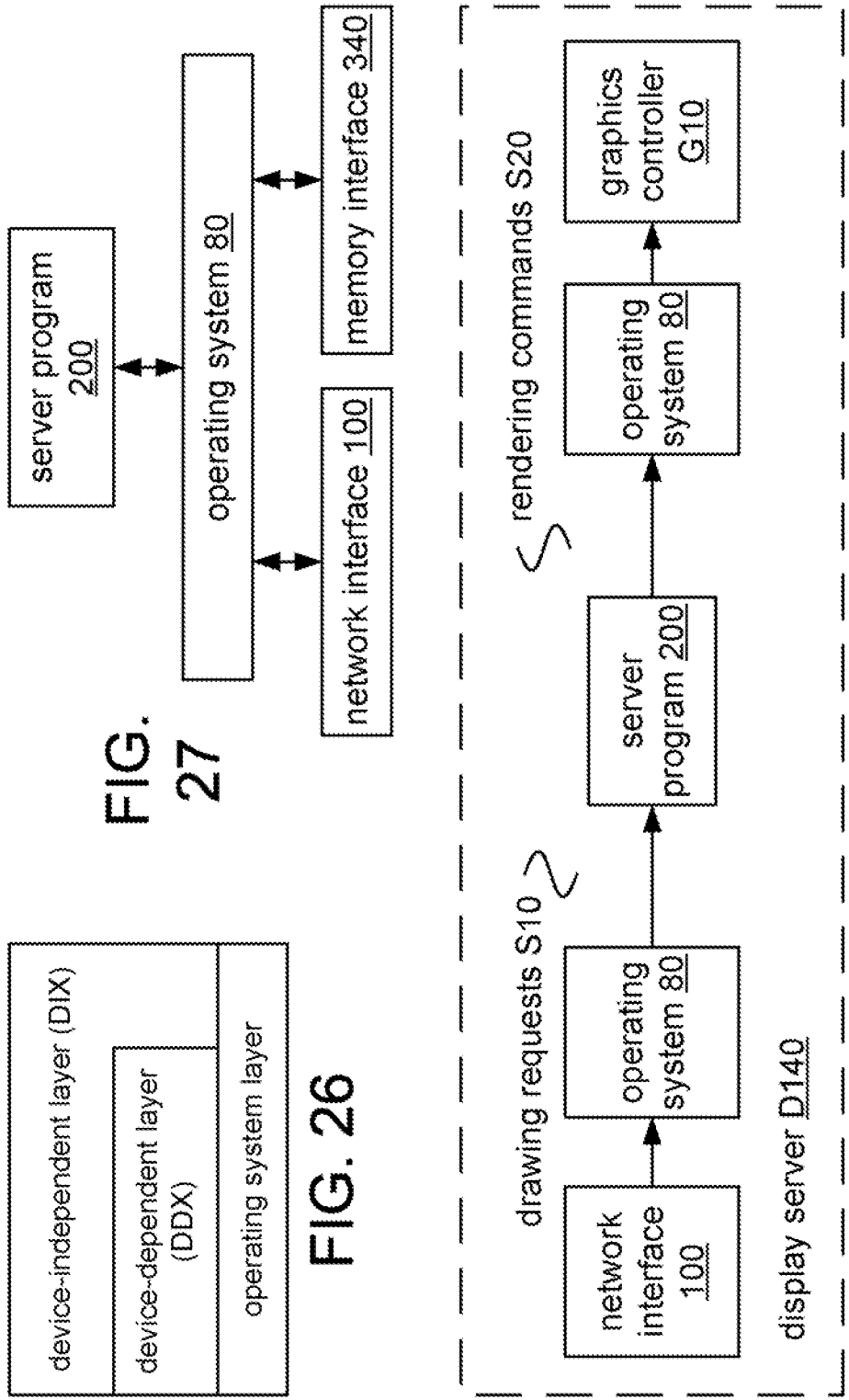

SYSTEMS, METHODS, AND APPARATUS FOR RECORDING OF GRAPHICAL DISPLAY

RELATED APPLICATIONS

This application claims benefit of U.S. Provisional Pat. Appl. No. 60/837,911, entitled "SYSTEMS, METHODS, AND APPARATUS FOR RECORDING OF GRAPHICAL DISPLAY," filed Aug. 16, 2006.

FIELD

This disclosure relates to graphical display systems.

BACKGROUND

Graphical display systems may be used in real-time applications, such as process control or traffic management, in which a graphical display is being continually, regularly, or intermittently updated.

Flight recorders are used in aircraft to record critical data and events for analysis in an air catastrophe or emergency situation. Such recording capability is also a requirement for major air traffic control (ATC) center upgrade systems. While it is possible simply to record the position and altitude of each aircraft from the radar target extractor, an actual recording of the display images seen by an air traffic control operator may be preferable, as it provides an integrated composite of the airspace.

One approach to recording the display images is simply to use an analog recorder to record the video signals sent to the display. However, a modern ATC display utilizes a 2048× 2048 resolution monitor with a refresh rate of 60 Hz. The resultant bandwidth of over 350 MHz precludes the use of a commercially available analog recorder.

SUMMARY

A display server according to an embodiment includes a server program configured to produce a first plurality of rendering commands based on a plurality of drawing requests; and a process configured to output a second plurality of rendering commands. The display server also includes a graphics processing unit configured to output, to a display buffer, a first plurality of pixels based on the first plurality of rendering commands and a second plurality of pixels based on the second plurality of rendering commands; and a recording module configured to record the plurality of drawing requests and to record a representation of the second plurality of pixels.

A display server according to another embodiment includes a first processing unit configured to produce (A) a first plurality of rendering commands based on a plurality of drawing requests and (B) a second plurality of rendering commands; a second processing unit configured to output, to a display buffer, a first plurality of pixels based on the first plurality of rendering commands and a second plurality of pixels based on the second plurality of rendering commands; and a recording module configured to record the plurality of drawing requests and to record a representation of the second plurality of pixels.

BRIEF DESCRIPTION OF THE DRAWINGS

FIG. 1A shows a block diagram of a system including a display server 10.

FIG. 1B shows a diagram of a display server 10 in communication with multiple clients.

FIG. 1C shows a block diagram of a system including an implementation 12 of display server 10.

FIG. 3 shows two views of an Isona™ display station (BarcoView, Kortrijk, Belgium and Duluth, Ga.).

FIG. 10A shows an execution flowchart for an implementation of record control process RP10.

FIG. 10B shows an execution flowchart for another implementation of record control process RP10.

FIG. 18A shows an execution flowchart for an implementation of a window capture function.

FIG. 18B shows an execution flowchart for an implementation of a window compression routine.

FIG. 23B shows a block diagram of an implementation G22 of graphics controller G20.

FIG. 23C shows a block diagram of an implementation G24 of graphics controller G20.

FIG. 26 shows a diagram of an X server.

FIG. 27 shows a diagram of communication among elements of display server D100 via operating system 80.

FIG. 28 shows a block diagram of an implementation D140 of display server D100.

DETAILED DESCRIPTION

Figure 2A:
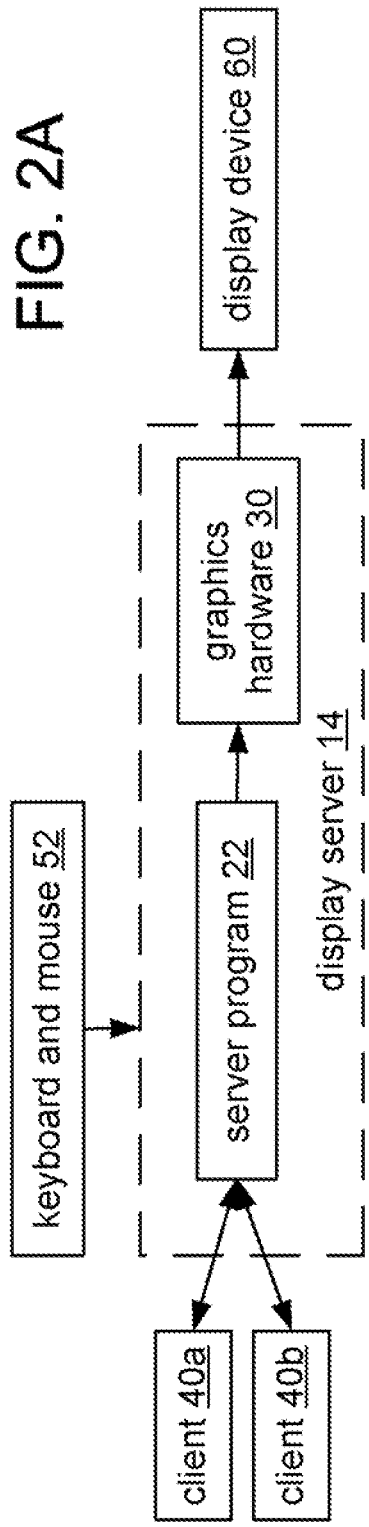
FIG. 2A shows a block diagram of a system including an implementation 14 of display server 10.

The term "program" is used herein to mean one or more sets (e.g. sequences) of instructions executable by one or more arrays of logic elements, such as transistors and/or logic gates. Examples of such arrays (also called "processors" or "computers") include single-core and multicore processors (such as microprocessors, digital signal processing units, graphics processing units, and embedded controllers), integrated circuits (such as application-specific integrated circuits (ASICs) and application-specific standard products (ASSPs)) having one or more IP cores, and programmable arrays (such as field-programmable gate arrays (FPGAs)) having one or more IP cores. During execution, a program may be embodied as one or more processes and/or threads which may communicate with hardware devices and/or with other processes and/or threads. Examples of programs include client programs (also called "client applications") and server programs.

Unless expressly limited by its context, the term "signal" is used to indicate any of its ordinary meanings, including a state of a memory location (or set of memory locations) as expressed on a wire, bus, or other transmission medium. Unless expressly limited by its context, the term "calculating" is used herein to indicate any of its ordinary meanings, such as computing, evaluating, generating, and/or selecting from a set of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "A is based on B" is used to indicate any of its ordinary meanings, including the cases (i) "A is based on at least B" and (ii) "A is equal to B" (if appropriate in the particular context). The term "to record" is used to indicate any of its ordinary meanings, including "to store."

FIG. 1A shows a block diagram of a computer system that includes a display server 10 and a display device 60. Display server 10 is configured to execute a server program 20 that receives and processes protocol requests, such as drawing requests that define graphics primitives at a high level of abstraction (e.g., in terms of geometrical shapes and in a manner that is independent of the particular form of graphics hardware G30). In response to the drawing requests, server program 20 outputs corresponding pixel-level graphics information, such as pixel-level or bitmap descriptions in the form of rendering commands that are executable by graphics hardware G30.

Protocol requests may also include commands to set attributes (e.g., line color and thickness, window location and size) and/or calls to extensions of server program 20. Server program 20 may be arranged to receive the protocol requests from a client program 40 (also called a "client"). For example, server program 20 typically receives protocol requests from internal and external processes (e.g., clients) via socket connections that are maintained by an operating system of display server 10. Display server 10 may include a processor (e.g., microprocessor) or other array of logic elements configured to execute server program 20.

Without limitation, server program 20 may be an application configured to run on an operating system such as Linux or another flavor of UNIX. In one example, server program 20 is an X server, such that communications of protocol requests between client 40 and server program 20 conform to at least one version (such as X11R6 or X11R6.6) of the X Window System Protocol (X.Org Foundation LLC, Brookline, Mass. and Delaware: www.x.org). In other cases, the protocol requests may be compliant with another remote presentation protocol such as the ICA protocol (Citrix Systems, Inc., Fort Lauderdale, Fla.), the Virtual Network Computing (VNC) protocol (AT&T Corp.), or the Remote Desktop Protocol (RDP) (Microsoft Corp., Redmond, Wash.). Thus, while terminology relating to X Window System Protocol is used herein, it is contemplated and hereby expressly disclosed that the principles may also be applied to systems utilizing one or more other remote presentation protocols, such as those referenced above.

Like a print server, a server program such as an X server provides access to certain hardware components so that local and/or remote clients (such as programs and applications) can share access to the hardware, with access being potentially provided to more than one application at a time. In the example of FIG. 1A, server program 20 provides access to graphics hardware 30 and ultimately to display device 60. At a work position or "seat," an operator may have one or more display devices (or "screens") and a keyboard and mouse to manipulate and/or interact with the display, with drawing requests and input information being exchanged between the client and server. Similar schemes are used in other input and display control systems such as Microsoft Windows 98, 2000, XP, and Vista (Microsoft Corp., Redmond, Wash.).

As shown in FIG. 1B, server program 20 may be implemented to receive drawing requests from more than one client. In this example, client 40b may be another application executing within display server 10, an application executing on the same computer as client 40a, or an application executing on another computer. Information from the clients may be displayed on display server 60 in different windows or otherwise as selected by the operator. Server program 20 may also be configured to transmit input information, such as from a keyboard or mouse, to one or more of the clients 40 (e.g., via one or more socket connections maintained by an operating system of display server 10). Although for the sake of simplicity only two clients are illustrated, the number of clients is not limited in principle. Server program 20 may be configured to process protocol requests from more than one client in a round-robin fashion or according to a priority scheme.

Display server 10 also includes graphics hardware 30 that is configured to receive the graphics information and to output a corresponding video signal to display device 60. Graphics hardware 30 may be implemented as an expansion card configured to plug into a bus of display server 10 (such as an ISA, VESA, VME, PCI, PCI Express, or AGP bus) or as an integrated chipset (such as a chipset affixed to a system board).

The video display image produced by display server 10 is usually updated at least several times a second. In an air traffic control context, for example, a screen image that represents the current positions of moving aircraft is typically redrawn (e.g., by a client 40) at a rate in the range of from one to ten times per second. This image refresh rate, which may be synchronous or asynchronous, is usually less than or equal to than the frame rate of the corresponding video signal (which is typically in the range of 60 to 85 Hertz). Display device 60 may be a cathode-ray tube (CRT) monitor; a flat-panel display such as a liquid-crystal display (LCD) panel, plasma display panel (PDP), or light-emitting diode (LED) panel; or a projection display including at least one spatial light modulator such as an LCD panel or digital micromirror device (DMD).

Display server 10 may be implemented as a workstation, such as a network terminal or a personal computer. In an alternative configuration of display server 10, a processor executing server program 20 is implemented in an enclosure (for example, in a network terminal) that is separate from a computer or other device that includes graphics hardware 30. Examples of hardware architectures and elements of implementations of display server 10 are disclosed in a section of additional information at the end of this description. The Visona™ display station (BarcoView, Kortrijk, Belgium and Duluth, Ga.) is one superior example of an implementation of display server 10 that is configured as a 2U rack mount unit having a depth of 19 inches.

FIG. 2A shows a block diagram of a system including an implementation 14 of display server 10. Display server 14 includes an implementation 22 of server program 20 that is arranged to service drawing requests from multiple clients 40. The resulting images from each client may be displayed in different windows of the display, or the display server may be configured to switch the display between images from the different clients as indicated, for example, by the operator.

In a typical application of a personal computer, nearly all significant screen display is initiated by the operator via a keyboard and mouse. In contrast, a display server used in an ATC application receives a significant amount of input fairly continuously from other sources (e.g., clients 40) in the form of protocol requests. Such a server may be configured to display a large number of maps and targets in real time without any additional action by the operator.

In the system of FIG. 1A, server program 20 is configured to receive protocol requests from a client program 40. During execution, client 40 may be implemented as one or more processes or threads executing on one or more arrays of logic elements, possibly on the same array or arrays as server program 20. In a typical system, client 40 executes on another machine, such as an application server. In this case, the other machine may also be referred to as the "client." Other arrangements are contemplated, however, in which all or part of client 40 executes on a processor of display server 10.

Protocol requests may be generated locally: for example, by one or more clients executing on a processor of display server 10. Alternatively, protocol requests may be received from one or more clients over one or more networks. The stream of protocol requests need not be synchronous or continuous, and in some cases the server program may receive no drawing requests for an extended period of time (e.g., tens of minutes).

A stream of protocol requests S10 includes high-level, device-independent graphics descriptions that are abstracted from the actual graphics hardware. The protocol requests are independent of the particular type or manufacture of graphics controller G10, such that a client 40 may issue protocol requests without regard to the underlying graphics hardware. The protocol requests may also be independent of operating system 80, such that client 40 and display server 10 need not run the same operating system.

A drawing request includes a request to draw a graphics primitive such as an arc, line or polygon at a particular location in a coordinate system (2D or 3D). In one example, drawing requests S10 are protocol requests compliant with at least one version of the X Window System Protocol ("the X protocol"). Examples of drawing requests supported by the X protocol include PolyPoint, PolyLine, PolySegment, PolyRectangle, PolyArc, FillPoly, PolyFillRectangle, and PolyFillArc.

A drawing request may specify a color, size, line weight (thickness), line style, fill style, position in a 2-D or 3-D display space, and/or text label for the requested primitive. Alternatively, the drawing request may indicate a graphics context that includes at least some of this information. In the X protocol, for example, each drawing request is associated with a graphics context, and a server program may also receive commands to alter an aspect of a graphics context.

A drawing request compliant with the X protocol typically includes one or more request codes that identify the desired operation, the graphics context to be used, the drawable (e.g., the window or pixmap) to which the primitive is to be drawn, and other data such as the location of the primitive to be drawn relative to an origin of the drawable. In other examples, a drawing request may specify one or more triangles, rectangles, or other graphics primitives in a form that is compliant with another high-level graphics interface such as OpenGL (Open Graphics Library, managed by OpenGL Working Group, opengl.org), or DirectX (Microsoft Corp, Redmond, Wash.).

A drawing request as produced by a client 40 may be based on information that the client receives from other sources, such as sensors and/or data servers. For example, a client 40 may receive data such as geographical maps; information regarding current weather conditions, locations of vehicles, etc.; and/or other characteristics or data corresponding to people, objects, or coordinates. Such information may be received by the client over a network, and in some cases the client 40 may transmit drawing requests based on such information into the same network.

Drawing requests processed by a server program 20 may correspond to real-world events and may represent changes over time in a progression of such events. For example, a drawing request may indicate an aspect of a physical process being monitored in real time. In one class of such applications, drawing requests S10 indicate the current positions of transportation vehicles, such as moving aircraft. Such positions may be sensed using radar and/or GPS (Global Positioning System) location. Display of such dynamic information may be overlaid onto a static image, such as a surface map, and/or may be combined with one or more images of other dynamic information, such as a weather map. Server program 20 and/or client 40 may also include support for panning the display window across a larger virtual image (e.g. according to commands entered via an input device 50).

Client 40 is configured to communicate with server program 20 over a bus or network, such as a local area network (LAN), using one or more protocols. Such communications may include drawing requests and input device information (e.g., as received from a keyboard and mouse). For example, display server 10 may be configured to receive drawing requests over a network such as an Ethernet network. Server program 20 may also be configured to send replies and/or events, such as user input or status updates, to client 40.

FIG. 1C shows a block diagram of a system that includes an implementation 12 of display server 10. Display server 12 has a network interface 100 (e.g., a 10/100/1000 BaseT port that may include a physical connection point such as an RJ-45 socket) and a display device 62 (for example, a CRT or LCD panel) integrated into the same enclosure as the other components of the display server. FIG. 3 shows two views of the Isona™ display station (BarcoView, Kortrijk, Belgium and Duluth, Ga.), one superior example of such a display server that has an active screen diagonal of twenty-eight inches and an active screen resolution of 2048×2048 pixels. As opposed to a display monitor having only a video interface, a display station of this type is a network appliance, like a printer, which may be connected to a network (via an RJ-45 socket, for example) and which multiple client applications can access.

Display server 10 is also configured to receive input information from one or more input devices 50, such as a keyboard and/or mouse. For example, a typical display server includes one or more serial or parallel input ports, such as PS/2 and/or USB ports. (An input port may also be configured to receive information from an input device over a wireless connection, such as a Bluetooth™ or ultra-wideband (UWB) link.) Input devices connected to such input ports may include data entry, pointing, and/or scrolling devices such as one or more keyboards, mice, touchscreens, stylus or touch pens, and the like. In the examples herein, keyboard and mouse 52 are indicated for ease of description, but it is expressly contemplated that any input device or devices that provide a human-machine interface for interacting with the application being displayed may be used, such as a microphone (for voice recognition) and/or camera (for gesture recognition).

The display server receives information from the input devices in the form of input events, which may include actuations of switches (such as keys or mouse buttons) and movements of a mouse or other pointing or scrolling device. At least some of the input events may indicate position data in an input space. For example, server program 20 may be configured to receive information regarding movement of a pointing device (such as a mouse or trackball, a glove, or a pen on a digitizer pad or tablet) and to output a corresponding pixel position in the display plane.

An operating system of the display server (e.g. a version of UNIX or Linux, Microsoft Windows, or MacOS) is typically configured to handle the input events from each input device initially, usually via a routine such as a device driver. The server program receives the corresponding input information from the operating system (e.g., via one or more socket connections) and forwards it to a client. For example, the server program may transmit the input information to the client as one or more X protocol messages.

Figure 2B:
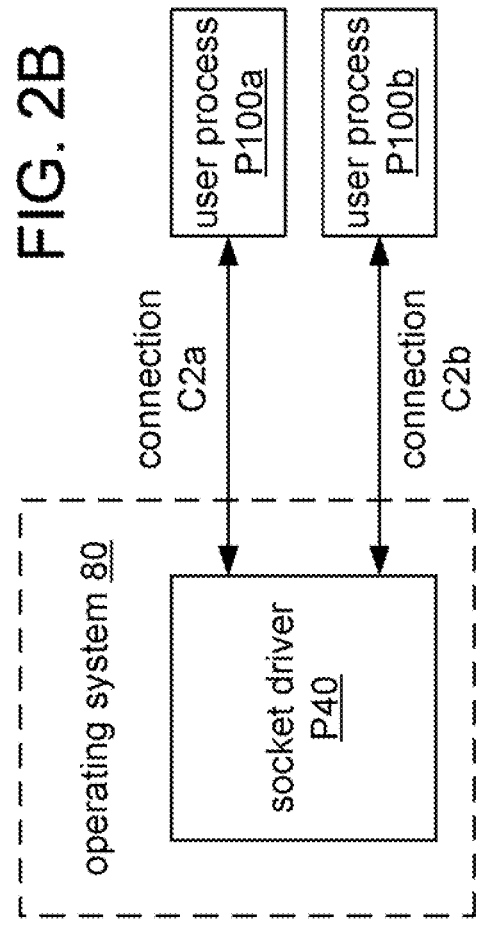
FIG. 2B shows an example of a socket driver supporting communication between two user processes.

The operating system of the display server is typically also configured to handle communications between different processes, such as communications between server program 20 and a client 40. Upon request, for example, the operating system may establish a dedicated communication channel such as a socket between two or more processes. FIG. 2B shows one example of a socket driver D40 of operating system 80 that supports communication between two user processes P100$a,b$ (e.g. server program 20 and record control process RP10). In one typical initialization sequence, user process P100$a$ is the first of the two processes to execute, and it opens a listening socket. When user process P100$b$ starts up, it signals this listening socket, and the two user processes execute handshaking operations with each other to establish a communication socket (including connections C2$a,b$) between them.

A rendering command includes one or more codes that indicate a desired graphics processing operation to graphics hardware 30 and may also include associated data such as location and/or color. A rendering command may indicate pixel values indirectly by specifying the vertices of a graphics primitive (e.g. a line, triangle, quad) or set of primitives (e.g. a quad strip or triangle fan). Such rendering commands are also called "hardware acceleration commands." Alternatively, a rendering command may explicitly indicate a value (e.g. an RGB value) to be assigned to a pixel; may assign a pixel value according to a location in a bitmap, texture map, or other type of map; and/or may assign a pixel value based on a lighting operation or other rendering operation. Such rendering commands are also called "value assignment commands." While value assignment is typically much slower than hardware acceleration, an appropriate hardware acceleration command may not be available for a particular object or pattern to be drawn (for example, an unusual dash/dot line pattern).

Server program 20 may be configured to produce rendering commands that are compliant with an instruction set of a processing unit of graphics hardware 30. For example, a rendering command typically includes one or more opcodes, which indicate operations to be performed by the processing unit of graphics hardware 30, and one or more operands, which indicate registers of the processing unit of graphics hardware 30, addresses in local memory of graphics hardware 30, and/or data values to be processed according to that operation or operations. Server program 20 may also be configured to produce rendering commands that are compliant with a shading language such as ARB Shading Language (Architecture Review Board) or OpenGL Shading Language (OpenGL), Cg (NVIDIA), or DirectX High-Level Shader Language (HLSL) (Microsoft).

In typical implementations of display server 10, a graphics controller and/or processing unit of graphics hardware 30 is configured to execute rendering commands produced by server program 20 and/or another drawing process and to store the resulting pixel values to a corresponding display buffer. In this document, the term "display buffer" is used to indicate a portion of memory to which the display frame (in other words, the screen image) is rendered and from which the display frame is scanned out to the display device. This term is similar to the term "frame buffer," which may be used in various contexts to indicate a display buffer, the collective area of memory to which rendered pixel values are stored, or the on-board memory of a graphics controller. Graphics hardware 30 may be configured to store rendered pixel values corresponding to different screen images produced by server program 20 to different display buffers.

As noted above, it may be desirable to obtain a record of a sequence of images, as displayed by display server 10 on display device 60, by a technique other than analog recording of a video signal displayed by display device 60. In some cases, such a record may be obtained by recording the sequence of protocol requests that server program 20 receives and executes to create the sequence of images. This recording operation is also called "protocol recording" or "protocol capture." To play back the sequence of images, the recorded sequence of protocol requests is submitted as input to display server 10 (or to another display server that is expected to generate the same response to the recorded sequence as display server 10, such as a display server executing a copy of server program 20).

Figure 4:
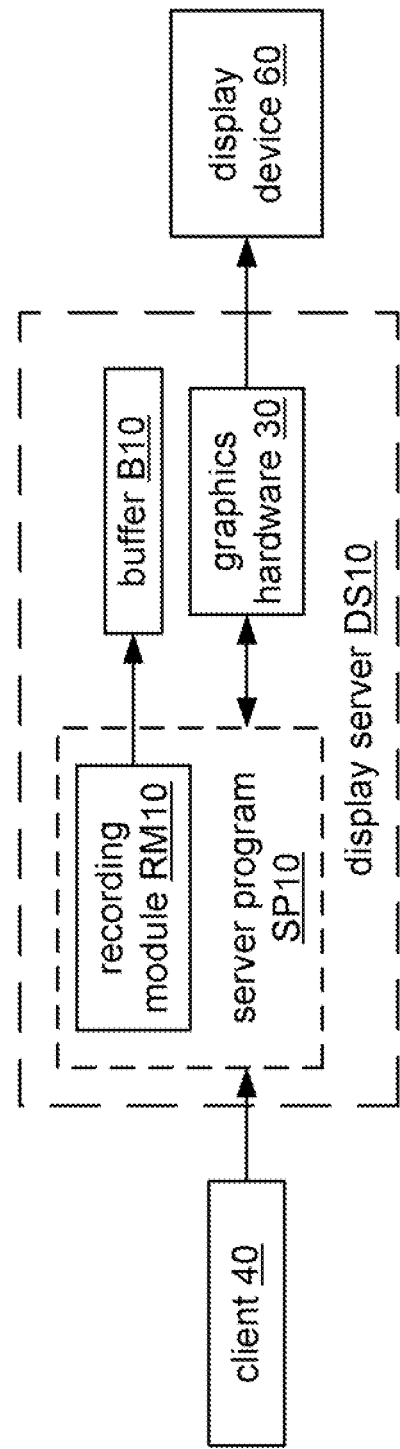
FIG. 4 shows a block diagram of a system including an implementation DS10 of display server 10.

For 2-D drawing clients of a server program such as an X server, protocol capture may be performed using a software layer between the server program and the protocol level. FIG. 4 shows a block diagram of a system that includes such an implementation DS10 of display server 10. Display server DS10 includes a buffer B10 and an implementation SP10 of server program 20 that has a recording module RM10. Recording module RM10 is configured to store to buffer B10 a record of the protocol requests received by server program SP10 from client 40. This record may be stored to nonvolatile (NV) storage (e.g., a magnetic or optical disk or array of such disks, a magnetic tape, or an array of nonvolatile storage elements such as flash, ferroelectric, magnetoresistive, or ovonic memory) and replayed at another time, possibly on a different machine (e.g., a different instance of display server DS10).

Display server DS10 may be based on any of the implementations of display server 10 as described herein, depending on the desired use. While it is contemplated and expressly disclosed that implementations of display server DS10 will usually be operably coupled to one or more input devices 50 as described herein, for convenience such devices are not illustrated. Likewise, server program SP10 may be based on any of the implementations of server program 20 as described herein, depending on the desired use.

Remote presentation protocols are typically highly state-dependent, such that the result of a particular command may depend on one or more previous commands. A command such as "set color," for example, will affect the screen appearance of graphics elements that are generated in response to subsequent drawing requests. If display server DS10 records only the sequence of protocol requests, then it may be necessary to play back that sequence from the very beginning (i.e., from the time when server program SP10 was initialized) in order to obtain an accurate representation of the display screen at any particular time during the recorded period. Some applications may require server program SP10 to execute continuously for extended periods. In such cases, hours (or even days, weeks, or months) of playback could be needed before the screen images corresponding to a particular time region of interest were finally ready to be viewed.

To allow an accurate playback of a desired portion of the recorded period to be obtained without having to replay the entire preceding sequence of protocol requests, display server DS10 may be implemented to record the state of server program SP10 at periodic intervals and/or according to some other event (such as a user action communicated via an input device 50). The state of server program SP10 at any particular time includes the current values of a set of internal variables of server program SP10 that controls a relation between a drawing request received by server program SP10 and a rendering command (or set of rendering commands) produced by server program SP10 in response to the drawing request. For example, the state of server program SP10 includes such information as the number of drawables in the current image and their locations and graphics contexts. The result of such recording is called a "snapshot" of the state of server program SP10, or a "state-snapshot" or simply "snapshot." In such manner, accurate playback of the recorded display for any desired recorded period may be achieved by playing back the last snapshot before the start of the desired period and then replaying the recorded sequences of protocol requests only since the point at which that snapshot was taken.

It may be desirable to obtain, for each image in the sequence of recorded images, a complete record of the image as generated by display server DS10. In some cases, however, a protocol capture operation may not support obtaining a record of the entire image in a practical manner. Protocol requests directed to server program SP10 may be used to generate only some of the content of the image, for example, and display server DS10 may be configured to generate the rest of the image content in response to another type of command. One such example relates to the use of modern development toolkits, which may include 3-D visualization capabilities, to create client applications. An image generated by such an application may include a window that is drawn by a 3-D visualization client, such as an OpenGL client, rather than in response to protocol requests directed to server program SP10.

In such cases, it may be desirable to obtain a video record of a portion of the display screen without recording the commands that were used to generate that portion. For example, server program SP10 or recording module RM10 may be configured to call or to perform a window capture function periodically to obtain such a record. Such a function may be configured to store to buffer B10 a record of at least a portion of the display screen (e.g., a record of at least a portion of a display buffer of graphics hardware 30).

Application program interfaces commonly use mappings called "dispatch tables" to associate incoming requests with functions or other subroutines. A dispatch table is typically implemented as an ordered list of function pointers. One common example of a dispatch table is an interrupt vector table, which associates each one of a set of interrupt request values to a corresponding interrupt handling routine.

Figure 5:
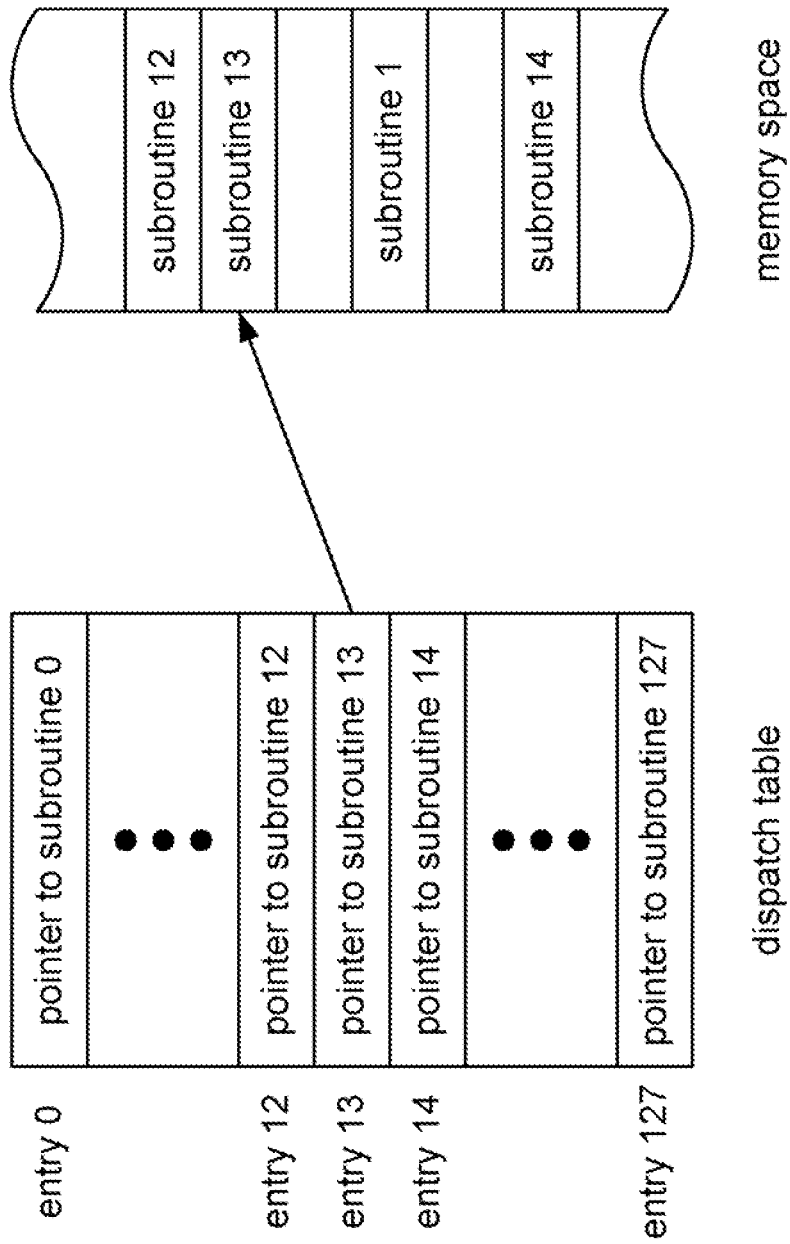
FIG. 5 is a diagram showing a relation between a dispatch table of a process and subroutines stored in a memory space of the process.

In the case of a graphics application program interface, the dispatch table is a list of pointers that associates each one of a set of different drawing requests with a subroutine that performs the respective drawing function (e.g., drawing a line). A typical implementation of server program SP10 includes a dispatch table that maps each of the standard X protocol request codes from 0 to 127 to the location in memory of a corresponding subroutine. These standard request codes include protocol requests to perform actions such as drawing a graphics primitive, storing colors, changing the shape of the cursor, and creating a window. FIG. 5 is a diagram showing an example of a dispatch table that maps each value from 0 to 127 to a corresponding subroutine elsewhere in the server program's memory space.

Server program SP10 is typically implemented to handle protocol requests by executing a dispatch loop that reads the queue of incoming protocol requests and calls the appropriate subroutines. For each iteration of this loop, the server program reads the next protocol request from the queue. The server program then reads the entry of the dispatch table that corresponds to the code value of the protocol request. This entry contains a pointer to the drawing subroutine associated with that code value. Finally, the server program performs the requested operation by calling the drawing subroutine.

Figure 6:
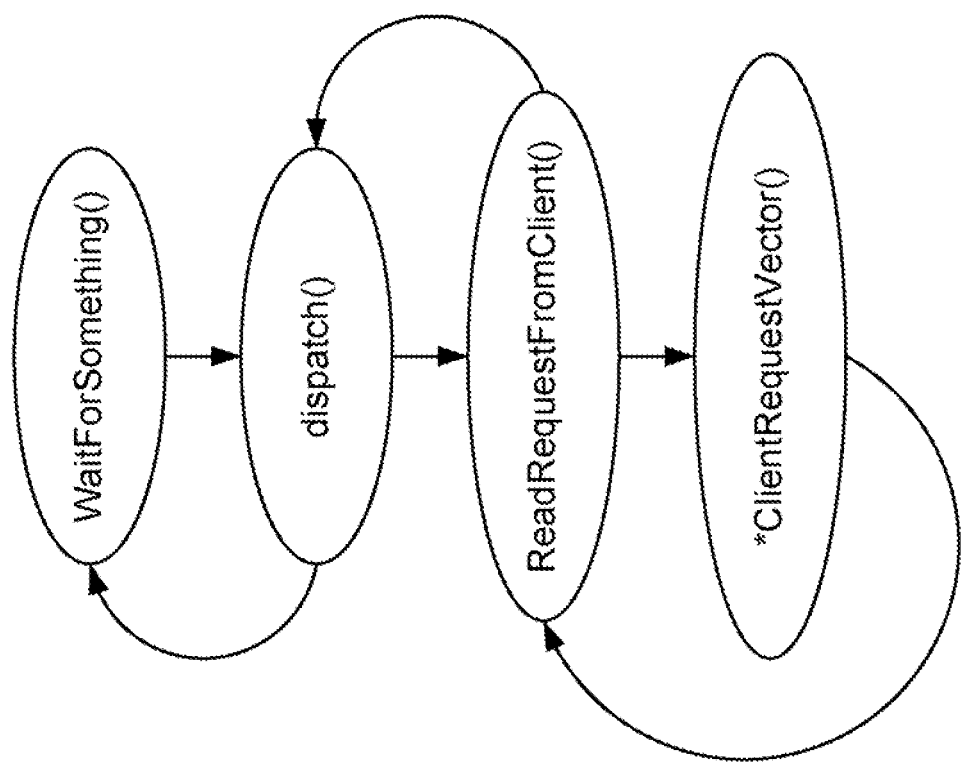
FIG. 6 is a diagram illustrating a dispatch loop of an X server.

FIG. 6 shows one example of a dispatch loop for such an implementation of server program SP10. When no input or tasks are currently pending, the server program remains suspended in a procedure called "WaitForSomething" until it is awakened by an occurrence such as an input event from the user (e.g., via an input device 50) or from a client (e.g., via a network interface). For example, the server program may be awakened by the operating system with a report of input pending on a socket connection. If the occurrence is the arrival of a protocol request from a client, then control passes to a dispatch routine of the server program, which calls the procedure "ReadRequestFromClient." This procedure produces a local variable that points to the protocol request. The server program uses this variable as a parameter of a command called "*ClientRequestVector," which calls a subroutine mapped to that protocol request by the dispatch table. The procedure "ReadRequestFromClient" may then be repeated until no more requests are pending from this client or until it is time to check for requests from other clients.

Recording module RM10 may be implemented to include a protocol recording subroutine that writes a copy of a protocol request to buffer B10. A corresponding implementation of server program SP10 may be configured to call this subroutine, for each protocol request to be recorded, before the associated drawing subroutine is executed. It may be desirable for such an implementation of server program SP10 to record the entire sequence of protocol requests it receives. Alternatively, it may be desirable for the server program to record only those protocol requests that may affect the images generated by display server DS10.

It may be desirable to change the dispatch table mapping such that each of one or more of the request code values is mapped to a different subroutine, such as a recording subroutine. When server program SP10 receives such a protocol request, it may be desirable for the server program to call this recording subroutine before executing the subroutine originally associated with that request code value.

Figure 7:
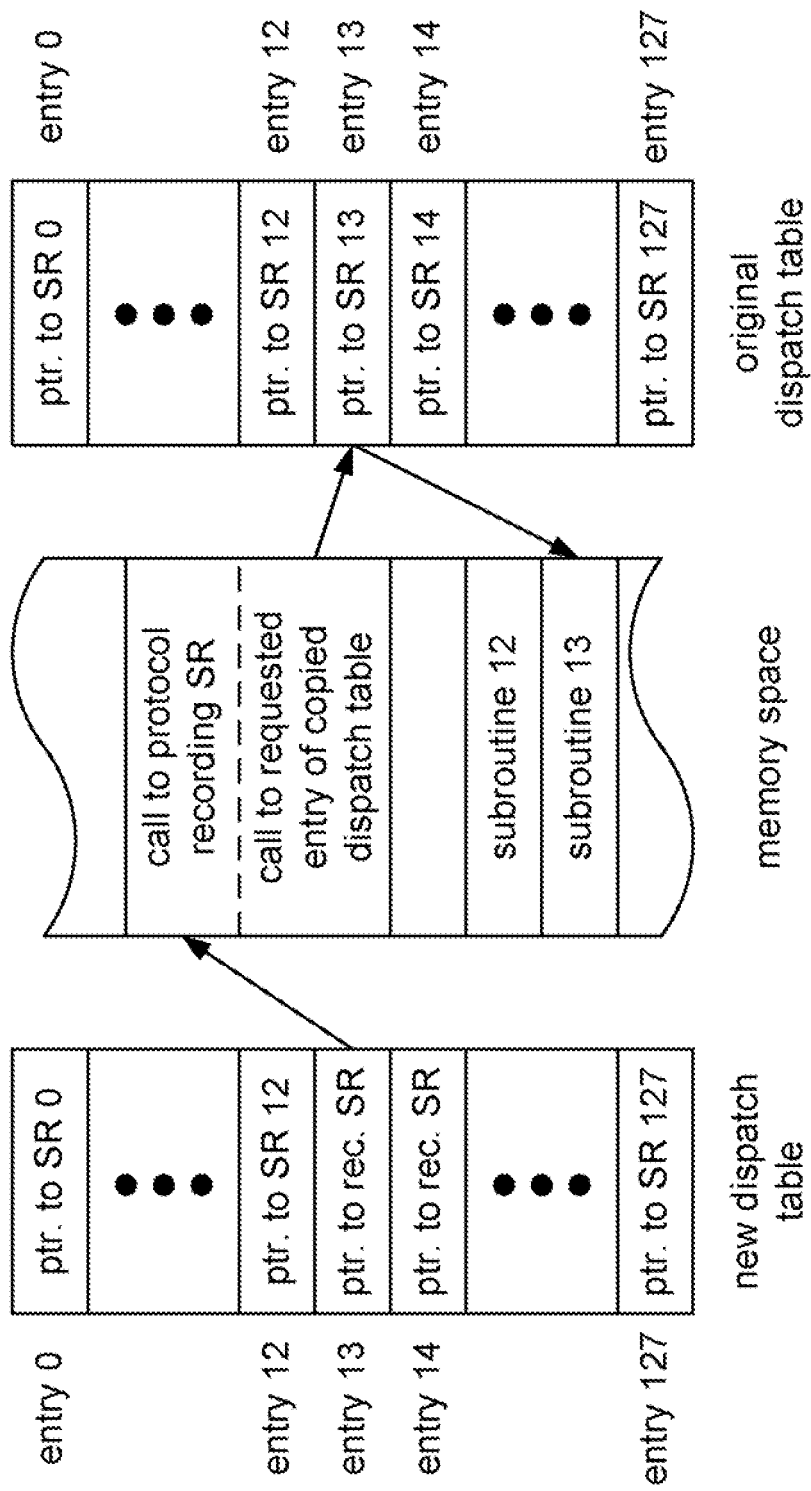
FIG. 7 is a diagram showing a modification of the arrangement of FIG. 6.

FIG. 7 is a diagram showing a modification of the arrangement of FIG. 5 in which the original dispatch table has been copied to another location, and a new dispatch table has been substituted in its place. In the new dispatch table, the original entries 13 and 14 have been changed to point to a new location in memory space. When either of these entries is invoked, a protocol recording subroutine is called. When the protocol recording subroutine returns, the dispatch routine calls the function originally mapped to the entry, via the copy of the original dispatch table. One or more (possibly all) of the entries of the original dispatch table may be redirected in such fashion, and any number of intermediate routines may be called before the originally mapped function is called. In some cases, it may even be desired not to call the originally mapped function.

In the example of FIG. 7, it is assumed that the value of the request code is available to the protocol recording subroutine. In such a case, different protocol requests to be recorded may be mapped to the same protocol recording subroutine, with the appropriate originally mapped function being called afterward according to the request code. It is possible, however, that in some applications the request code value may not be available to the protocol recording subroutine. In this case, each protocol request to be recorded may be remapped to a corresponding unique version of the protocol recording subroutine, with each version of the protocol recording subroutine being configured to point to one corresponding entry of the copy of the original dispatch table.

The operation of expanding the mapping of an incoming request to a corresponding function to include one or more intermediate routines is called "installing a wrapper" around the function. For example, the process of copying a dispatch table to a new location, and storing a new dispatch table in its place which points indirectly to the entries of the copied original dispatch table, is called "installing wrappers" around the redirected functions. Effectively, one or more function calls are inserted into the normal execution path for each of the protocol requests to be recorded. For example, it may be desired to record only those protocol request codes that result in or affect output on the screen. The wrappers may be installed dynamically when recording is activated and removed when recording is deactivated. Except for the operation of copying and replacing the original dispatch table, the X server need not be modified or even aware that the wrappers have been added. An X server may also include one or more event wrappers, where an event wrapper is a standard hook that adds a callback when a particular event occurs (such as a mouse click).

In addition to the standard protocol requests, some server programs may be expanded to support other protocol requests by adding extensions to the server program. For example, an X server is typically configured to support up to 128 additional request codes (e.g., codes 128-255) for extensions, and in a typical installation an X server is configured to recognize about twenty-five extension codes (also referred to as "major opcodes"). Each extension may be mapped to only one subroutine, or one or more of the extensions may be implemented to support more than one function (usually, a class of functions that are related to different aspects of the extension).

In a general example of display server DS10, server program SP10 is implemented as an X server and recording module RM10 is implemented as an extension to server program SP10. It may be desirable in this case for recording module RM10 to be dynamically loaded as a loadable extension (i.e., as opposed to being statically linked to server program SP10). Server program SP10 is typically configured to perform a set of initial tasks upon startup. For an X server, this set of initial tasks usually includes reading a configuration file that includes a list of extensions to load. The configuration file may include a flag that indicates whether recording is to be supported, and the file may also include configuration options for the recording process. Server program SP10 may be configured to dynamically load recording module RM10 as an extension, to resolve external references to functions and variables, and then to call a subroutine that initializes the extension.

Figure 8:
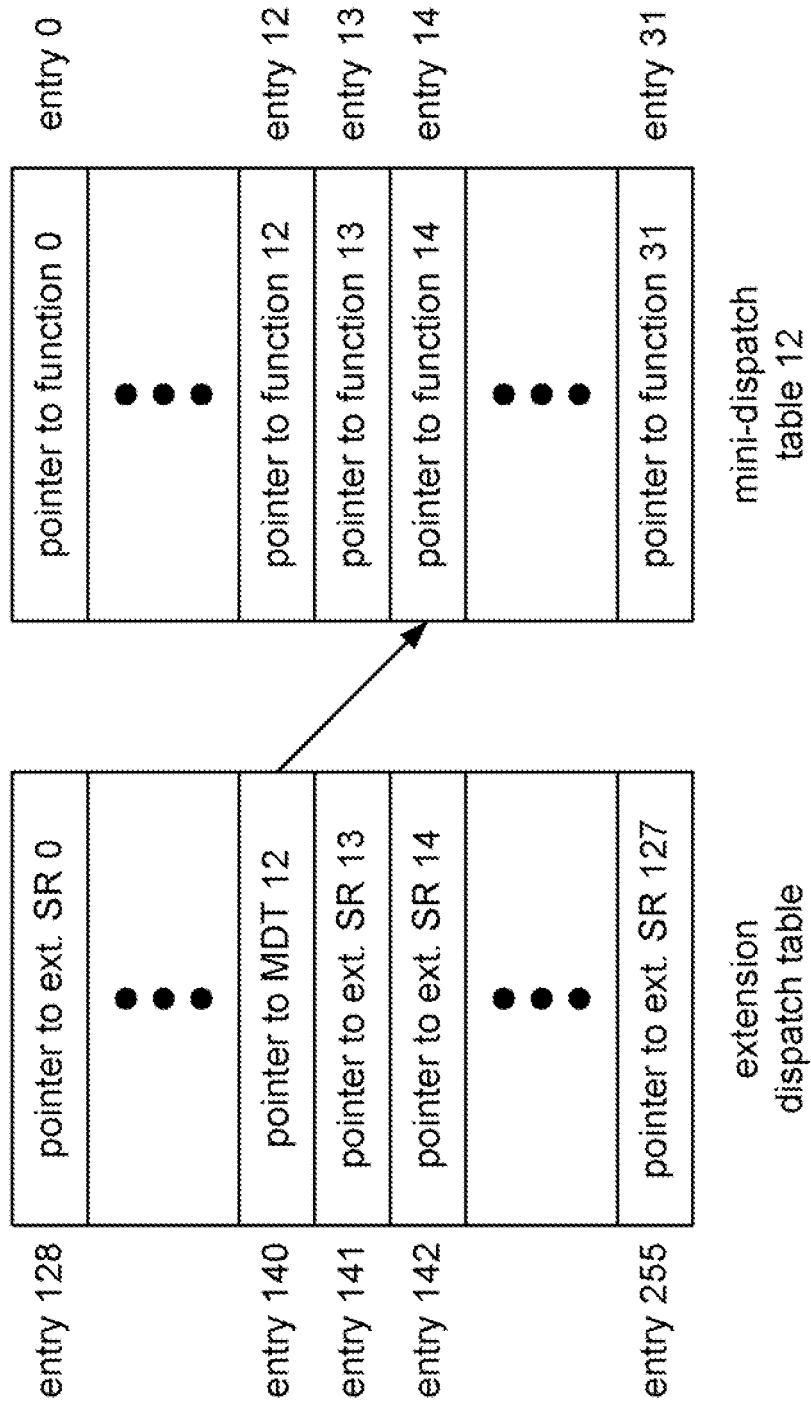
FIG. 8 is a diagram showing a relation between an extension dispatch table and a mini-dispatch table that corresponds to one of the extensions.

FIG. 8 is a diagram showing an example of an extension dispatch table in which the extension request code 140 is mapped to another, smaller dispatch table. In this example, this mini-dispatch table includes pointers to 32 different functions. Of these 32 functions, one would be selected according to the value of a second parameter of the protocol request code 140 (also referred to as a "minor opcode" of the extension request). In this example, function 14 is selected. For a typical example in which recording module RM10 is implemented as an extension to server program SP10, the recording extension supports calls to about fifteen different functions (e.g., via a corresponding mini-dispatch table).

It may be desired to perform some tasks of the overall recording operation within server program SP10 and to perform other tasks of the recording operation outside server program SP10. In one example, display server DS10 is configured to capture incoming protocol requests and write them to the current position in a circular buffer in a portion of the memory space of display server DS10 that is writeable by server program SP10 and readable by a record control process (i.e., a shared memory segment). When the buffer has accumulated enough data (e.g., 64 kilobytes), the server program wakes up the record control process with a message indicating where the data is and how much is available to store. The record control process writes the data to nonvolatile storage and returns a message to the server program so that this portion of the buffer may now be reused. The nonvolatile storage may be within display server DS10, external to display server DS10, and/or remote to display server DS10 (e.g., redundant copies may be written to different storage devices in different locations). The record control process then goes back to sleep until the server program wakes it up again.

Figure 9:
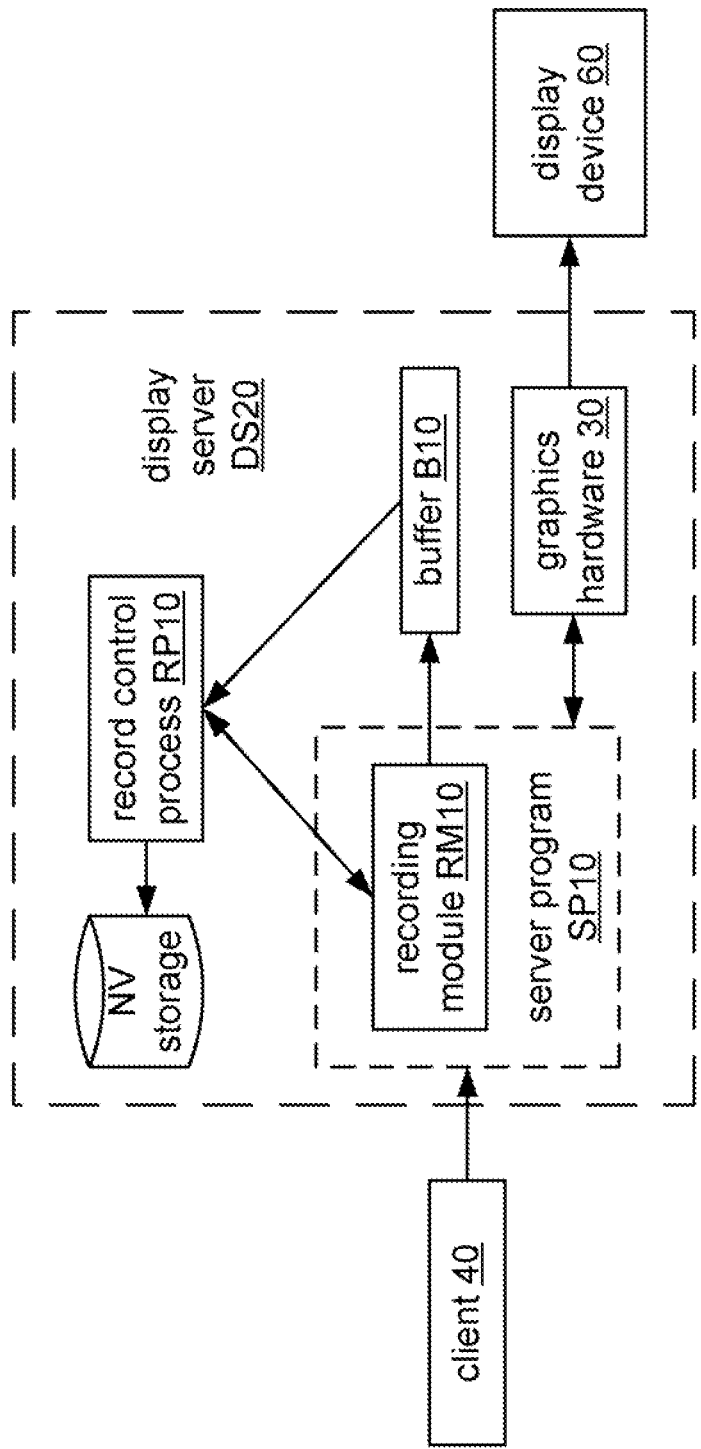
FIG. 9 shows a block diagram of a system including an implementation DS20 of display server DS10.

FIG. 9 shows a block diagram of a system including an implementation DS20 of display server DS10. Display server DS20 includes a record control process RP10 that is configured to initiate protocol recording and to store recorded protocol from buffer B10 to nonvolatile storage. In some cases, record control process RP10 executes as a user process (e.g., as opposed to a kernel-mode process) configured to communicate with server program SP10 as a client (e.g., by passing protocol requests over a socket connection).

An operating system such as UNIX, MacOS, or Windows typically supports the sharing, between two or more processes, of a portion of the memory space. Such shared memory may be used to pass data efficiently from one process to another. FIG. 10A shows an execution flowchart for an implementation of record control process RP10. Task RT20 calls the operating system to allocate a shared memory segment, which serves as storage for buffer B10. Task RT30 passes a label identifying the shared memory segment to recording module RM10. In task RT40, record control process RP10 sleeps while recording module RM10 stores copies of incoming protocol requests to the shared memory segment. When a chunk of data is available for storage, record control process RP10 is awakened (e.g., by recording module RM10) to perform task RT50. Task RT50 stores the chunk to disk storage, releases that portion of the shared memory segment for reuse, and returns to sleep mode RT40. Task RT50 may also be configured to compress the chunk before or during storage using a lossless operation (for example, the UNIX command "zlib" or "gzip"), which may achieve a reduction ratio as high as 5:1. A typical complex ATC display that updates the screen at a rate of 1-4 Hz generates less than 100 MB/hour of protocol (20 MB/hour after compression).

FIG. 10B shows an execution flowchart for another implementation of record control process RP10 that includes task RT10, which first determines whether recording is supported (e.g., according to a response received from a call to a particular function of recording module RM10). Record control process RP10 may be configured to receive the copied protocol requests as time-stamped blocks of data, and process RP10 may be implemented (e.g., according to FIG. 10A or 10B) such that it is not necessary for the process to interpret any of the protocol it is recording.

Display server DS10 may include a subroutine configured to install wrappers around the protocol calls to be recorded. FIG. 11A shows one example of an execution flowchart for an install subroutine, which may be mapped as an extension or as a function of an extension. For example, such an install subroutine may be implemented as part of recording module RM10. Task 110 receives a label identifying a shared memory segment (e.g., as a parameter in an extension call from record control process RP10). Task 10 also attaches server program SP10 to the shared memory segment (e.g., as the data storage area of buffer B10). Task 120 installs wrappers around the protocol calls to be recorded (e.g., by inserting a new dispatch table into the dispatch loop ahead of the original dispatch table). The install subroutine may also include a task of reporting success or failure of the installation to the calling process. Recording module RM10 may also include a removal subroutine (which may be mapped as an extension or as a function of an extension) configured to remove the wrappers and free the shared memory segment.

Figure 11B:
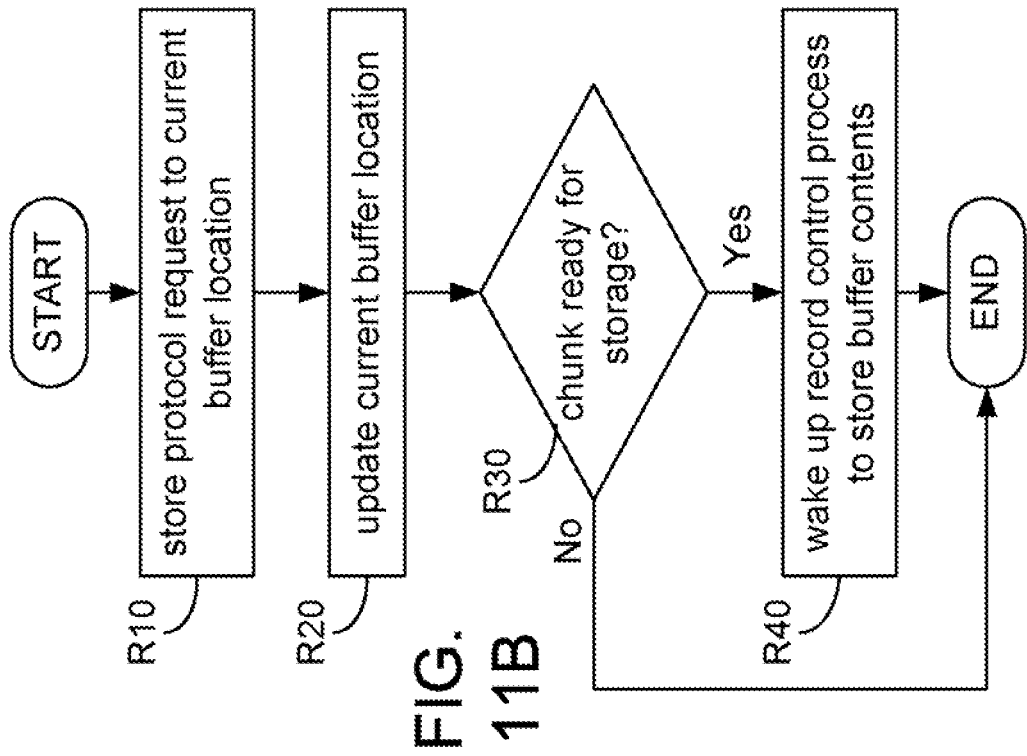
FIG. 11B shows an execution flowchart for an implementation of a protocol recording function of a record extension.
Figure 11A:
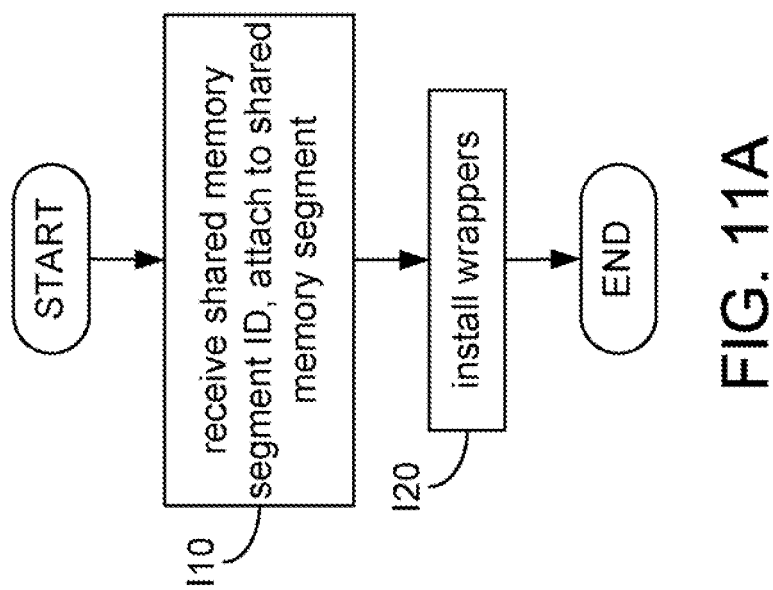
FIG. 11A shows an execution flowchart for an implementation of an install function of a record extension.

FIG. 11B shows one example of an execution flowchart for a subroutine that is called to perform protocol recording (e.g., within a wrapper of the protocol request to be recorded). Task R10 stores a value that identifies the current protocol request (e.g., the protocol request code) to the current location within buffer B10. Task R20 updates the current buffer location. Task R30 determines whether enough data has accumulated in buffer B10 such that a chunk of data is ready for storage to disk (or other nonvolatile storage). In one example, the chunk size is 64 kilobytes (KB), although other values such as 2, 4, 8, 16, 32, 128, or 256 or more KB may also be used, depending on factors such as a tradeoff between granularity and system load. If a chunk is ready for storage, task R40 wakes up record control process RP10 to perform the storage operation, and the routine returns. Record control process RP10 may perform the operation of updating a pointer that indicates the next chunk to be stored, or task R40 may include performing such an operation (e.g., upon receiving confirmation of the storage operation from record control process RP10). In an implementation of display server DS10 that does not include record control process RP10, task R40 may be configured to perform the disk storage operation.

In an alternative method of recording protocol without installing wrappers, the source code of a server program is altered to support recording. In one example of this method, for each of the protocol request codes to be recorded, the function to which the protocol request points is altered to begin with a call to a protocol recording function (perhaps preceded by a routine to check whether recording has been selected). As the functions pointed to by each protocol request differ from one graphics card to another, such a method may require tailoring the X server source code differently for different graphics cards. In contrast, a typical advantage of a wrapper implementation is device independence, such that the same wrappers may be used in display servers having different graphics cards.

The protocol used to specify a graphics object uses much less data than typically results from drawing into the frame buffer. A simple 24-byte protocol command, for example, can produce a fill area that specifies hundreds of bytes in the display buffer. Recording the protocol instead of the analog video is an ideal approach when only server program SP10 and graphics hardware 30 are used for video signal generation.

Figure 12:
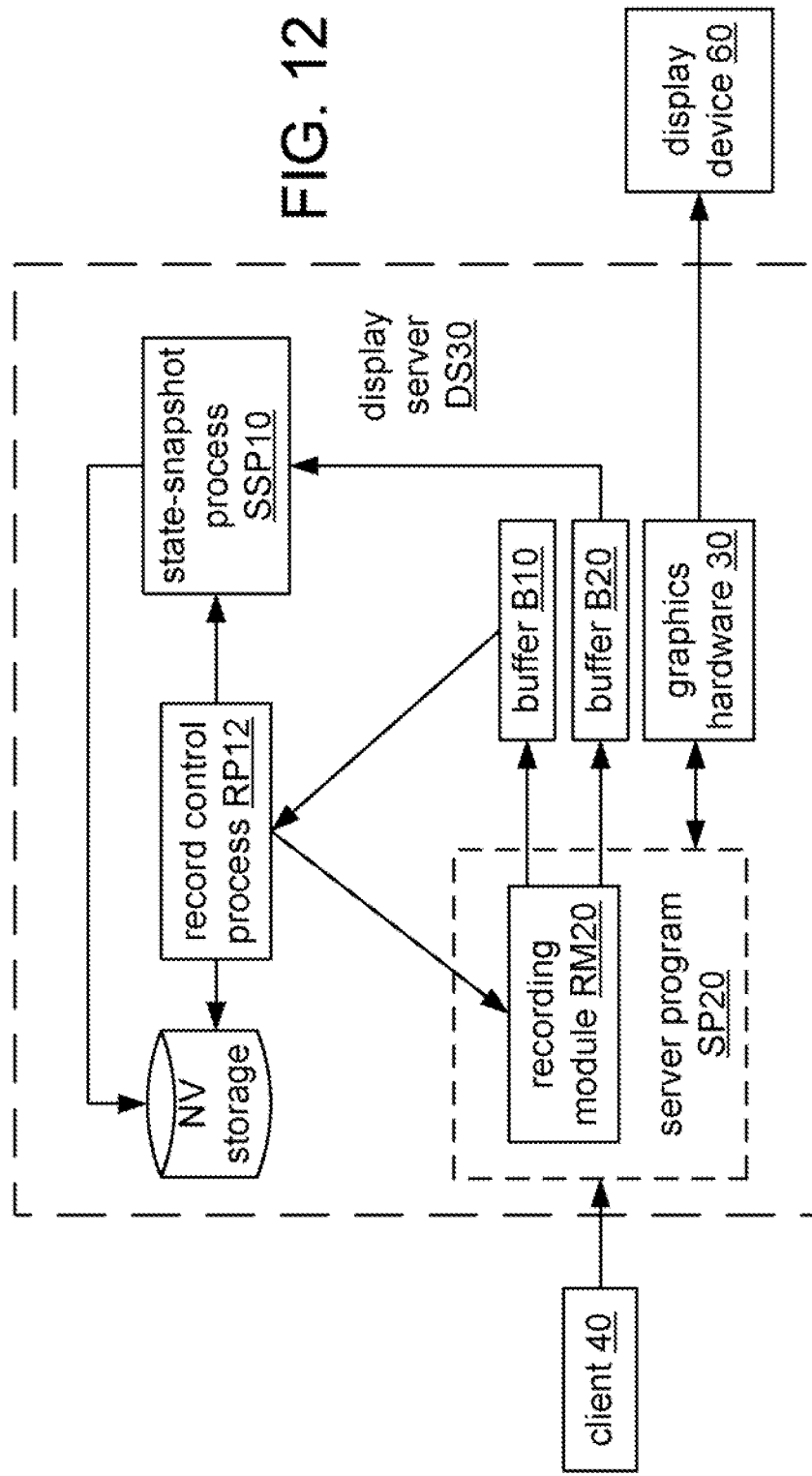
FIG. 12 shows a block diagram of a system including an implementation DS30 of display server DS10.

FIG. 12 shows a block diagram of a system including an implementation DS30 of display server DS10 that has a state-snapshot process SSP1 and a second buffer B20. Display server DS30 also includes an implementation RM20 of recording module RM10, an implementation SP20 of server program SP10, and an implementation RP12 of record control process RP10.

Figure 13:
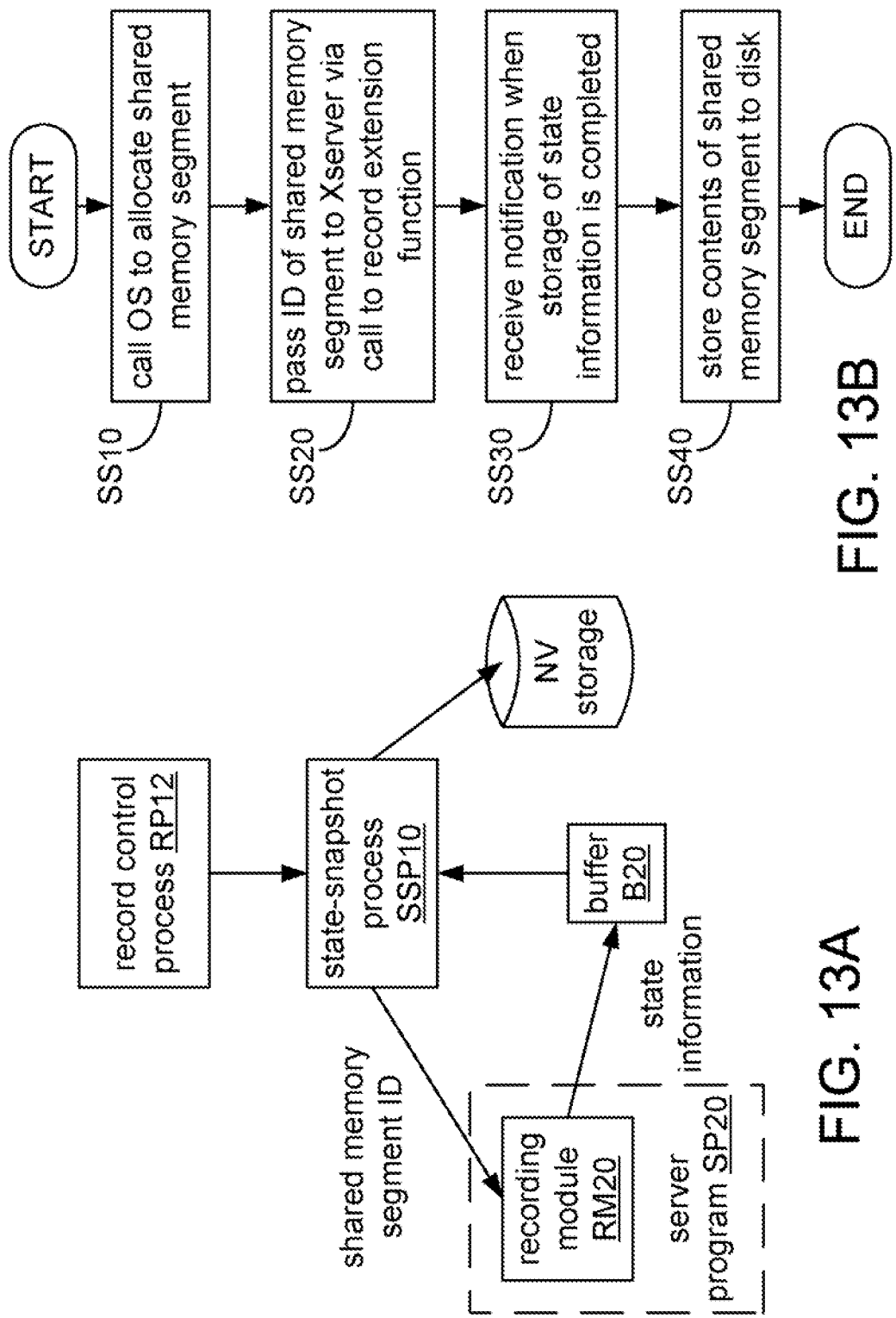
FIG. 13A is a block diagram showing an interaction among elements of display server DS30 in performing a state-snapshot capture.
FIG. 13B shows an execution flowchart for an implementation of a state-snapshot capture process.

FIG. 13A is a block diagram showing one example of an interaction among elements of display server DS30 in performing a state-snapshot capture. Record control process RP12 initiates state-snapshot process SSP10 according to a timer expiration, user action, or other event. In a typical example, record control process RP12 is configured to initiate state-snapshot process SSP10 at an interval of from two to thirty minutes (e.g., every five, ten, fifteen, or twenty minutes). The interval between state-snapshots may be specified as a parameter in a configuration file of server program SP20. Record control process RP12 may be configured to initiate state-snapshot process SSP10 by calling an extension or extension function of server program SP20. Alternatively, state-snapshot process SSP10 may be implemented to execute separately from server program SP20.

Figure 14:
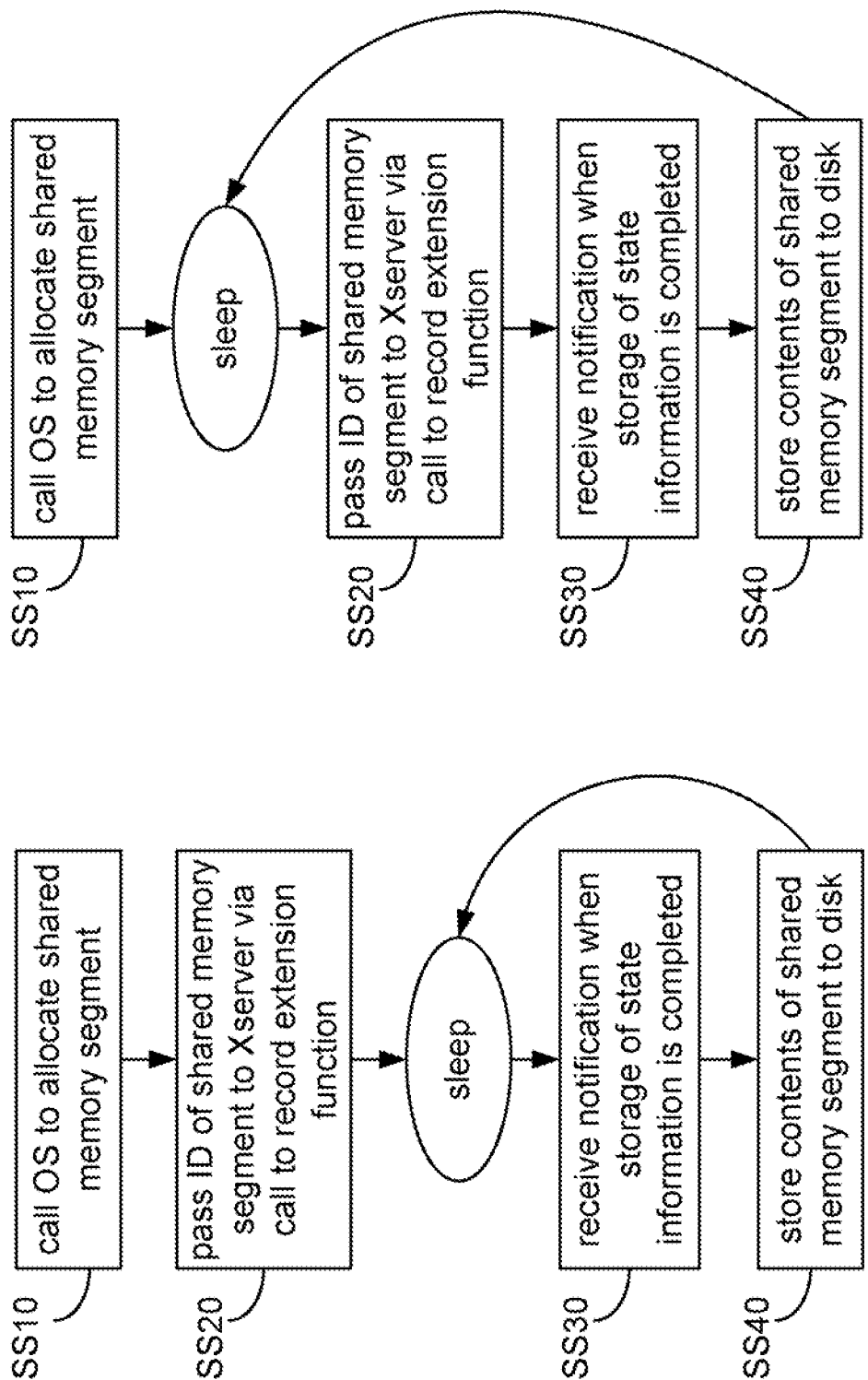
FIG. 14A shows an execution flowchart for another implementation of a state-snapshot capture process.
FIG. 14B shows an execution flowchart for a further implementation of a state-snapshot capture process.

FIG. 13B shows one example of an execution flowchart for state-snapshot capture process SSP10. Task SS10 requests an allocation of shared memory (e.g., for buffer B20) from the operating system. Task SS20 passes to recording module RM20 a label that identifies the shared memory segment. (For a case in which recording module RM20 is implemented to include an extension of server program SP20, state-snapshot process SSP10 may be configured to pass this label as a parameter in a call to the extension, or in a call to a function of the extension for copying a state-snapshot.) Recording module RM20 copies state information of server program SP20 to buffer B20 and notifies state-snapshot process SSP10 when the copying operation is complete. Task SS30 receives the notification, task SS40 stores the state information from buffer B20 to nonvolatile storage, and state-snapshot process SSP10 terminates. FIGS. 14A and 14B show examples of execution flowcharts for implementations of state-snapshot capture process SSP10 that are configured to loop to a sleep state (e.g., to be awakened by record control process RP10) rather than to terminate.

Figure 15:
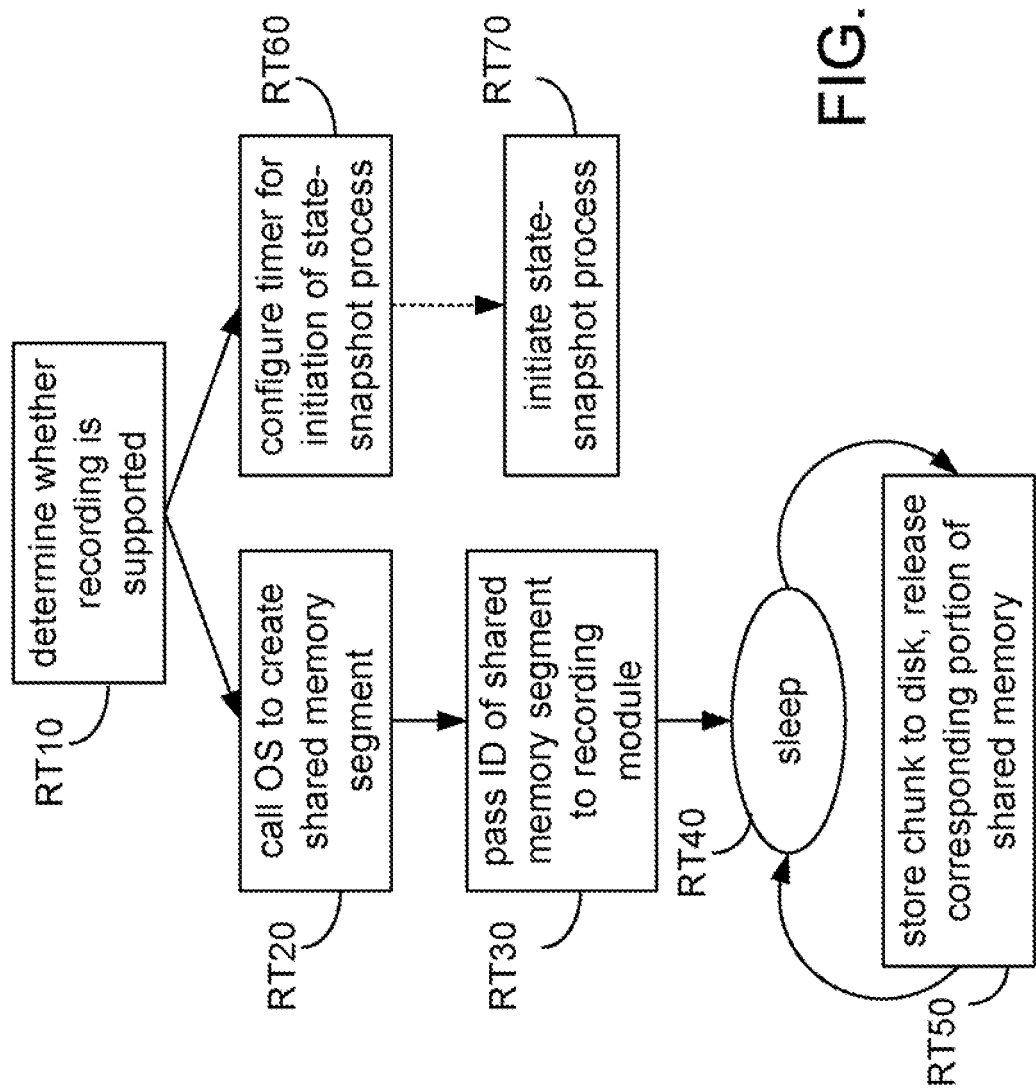
FIG. 15 shows an execution flowchart for an implementation of record control process RP12.

State-snapshot process SSP10 may be configured to receive the state information as time-stamped blocks of data. State-snapshot process SSP1 may also be implemented (e.g., according to FIG. 13B) such that it is not necessary for the process to interpret any of the state information it is recording. FIG. 15 shows one example of an execution flowchart for an implementation of record control process RP12. This implementation of record control process RP12 includes a task RT60 that configures a timer according to a desired time interval and a task RT70 that initiates (or awakens) the state-snapshot process upon each expiration of the timer.

It may be desirable to minimize an effect of the state-snapshot recording operation on the responsiveness of the server program. Recording module RM20 may be configured to respond to a snapshot request from state-snapshot process SSP10 by executing a "fork" operation. This operation creates a child process that is a copy of the parent process (i.e., server program SP10). Because the child process contains all of the state data of the parent process but operates at a lower priority, the state information may then be copied to buffer B20 without significantly impacting the responsiveness of server program SP20. Because the fork operation is handled by the operating system, it is typically fast and efficient, such that server program SP20 may be unavailable to process protocol requests for only about ten to 100 milliseconds (i.e., during the fork operation).

It may be desirable for the copied state information to include any internal state information of server program SP20 that a server program configured for playback of the recorded protocol may need in order to accurately recreate the corresponding parts of the display images. In some cases, such state information may be inaccessible by an extension of server program SP20 but visible to a client of the server program. In such case, the server program may be configured to prompt the client to send the information in a protocol request (e.g., during an initialization procedure, according to an interval, or upon an event such as a request by the recording extension (e.g., by task SS20) or the record control process (e.g., by task RT70)) and to forward the received information via a call to the recording extension.

Although a server program may render graphics primitives to the display screen serially, it is also common for a server program such as an X server to render graphics primitives to an offscreen pixmap. In such an operation, the client issues requests for a pixmap to be created and for protocol requests to be drawn to it. When the pixmap is completed, the client issues another request to copy the completed pixmap to the display buffer. In a typical air traffic control application, a client may instruct a server program to allocate on the order of fifty megabytes of storage for offscreen pixmaps. Although OpenGL clients do use some form of buffering, they do not typically use pixmaps, and their buffers are not usually readily accessible by a server program.

In some cases, it may be desired to simply record the display buffer rather than recording any protocol requests. For example, the portion of the screen that is drawn using protocol requests that can be recorded may be small (e.g., 10% of the screen area) compared to the portion of the screen that is drawn otherwise (e.g., via direct rendering as discussed below). In such a case, the entire root window may be copied without regard to whether it contains any other windows, and any offscreen pixmaps may be ignored. Instead of state-snapshots, it may be sufficient in such cases to record only very general information such as root window size and color depth. However, even in these cases it may still be desirable to record protocol requests relating to changes in the cursor shape and position, as this information may help to improve the visual presentation and/or increase apparent continuity during playback.

If the recording is to include protocol requests drawn to windows, however, then the information stored in the pixmaps should be recorded as well, as the contents of the corresponding windows may be undefined otherwise. It may be desirable to configure server program SP20 such that recording of large pixmaps may be avoided. In one example of such a configuration, a state-snapshot is taken without recording one or more of the pixmaps. After the snapshot is initiated, server program SP20 sends a request to its clients to redraw the display. For example, state-snapshot process SSP10 may be configured to prompt server program SP20 to issue an "expose" event, which is a message that instructs a client 40 to redraw an area of the display image. Compliance with the X protocol, for example, requires a client 40 to respond to such an event by sending protocol to restore that area of the display image which it controls. The server program may be configured such that expose events are sent to all current clients or only to current clients associated with a pixmap that has not been stored. In response to this expose event, the client sends protocol requests to redraw the application window, all of the pixmaps it maintains, and any commands to copy pixmaps to the screen. These protocol requests, which usually take up much less space than the pixmaps, are then captured as usual and can be used during playback to draw the window.

It may be desirable for a state-snapshot to include, in addition to a copy of the drawing state of server program SP10, a representation of the frame state of server program SP10 (e.g., the displayed image as stored in the display buffer of graphics hardware 30). In an OpenGL context, the state information includes a flag for each window that indicates whether the window is an OpenGL window. While it may be possible to retrieve and store the current contents of the display buffer during a snapshot capture, such an operation may present an unacceptable delay in at least some applications. In an air traffic control context, for example, the screen image stored in the display buffer may be four megabytes or more. Reading such an image over a PCI bus interface may take as long as one second, during which time server program SP10 may be precluded from executing any drawing operations. Such a delay may be unacceptable in this context as well as many others. As discussed herein, use of a faster bus for communications with graphics hardware 30, such as a PCI Express bus, may greatly reduce the amount of time required to read information back from the display buffer. Notwithstanding the delay issue, however, storing the screen image may increase storage requirements to an undesirable or unacceptable level. This increase may be especially severe in a case where a relatively high snapshot frequency is desired (e.g., every five minutes or less), even if the image is compressed for storage.

As an alternative to recording the screen image stored in the display buffer, state-snapshot process SSP10 may be configured to prompt server program SP20 to issue an expose event to all of its connected clients 40. As a result, server program SP10 receives all of the protocol needed to recreate those portions of the screen image that were generated from protocol requests. This redrawing procedure typically takes less than five seconds, during which time server program SP10 typically continues to process protocol requests as usual and remains responsive to the operator, such that the operator is usually unaware that the procedure is taking place.

In addition to the protocol and state-snapshot records, display server DS30 may be configured to maintain an index file that stores a correspondence in time between the two records. For example, record control process RP12 may be configured to maintain an index file that includes a list of entries, in which each entry maps an offset in the protocol record to a corresponding offset in the state-snapshot record. One example of such an index file includes an entry for each state-snapshot in the state-snapshot record. This entry indicates the offset of the state-snapshot in the state-snapshot record (e.g., as reported by state-snapshot process SSP10) and the offset of a corresponding time point in the protocol record. The index file entries may also indicate the actual start and stop times for the corresponding snapshot, and the index file may include related information such as the number of snapshots and the sizes of the protocol and state-snapshot records. For an implementation in which the recorded protocol requests and the recorded window captures are stored to different files, an index file entry may also indicate the offset of a corresponding time point in the window capture record.

Some control systems may be configured to provide warnings during operation. For example, an ATC installation may be configured to issue a near-collision warning. Display server DS10 may be configured to record indicators of such warnings into one or more of the recorded files, such as the index file. For example, record control process RP12 may be configured to insert a record of each warning received during a particular period, together with a record of the warning's time of occurrence, into a corresponding entry of the index file. During playback, a GUI of the playback application may be configured to display such entries differently than others (e.g., using a different font, a different color, a particular symbol, blinking, and/or an annotation). In a similar fashion, other time-related information may be stored into the index file for possible review during playback.

Figure 16A:
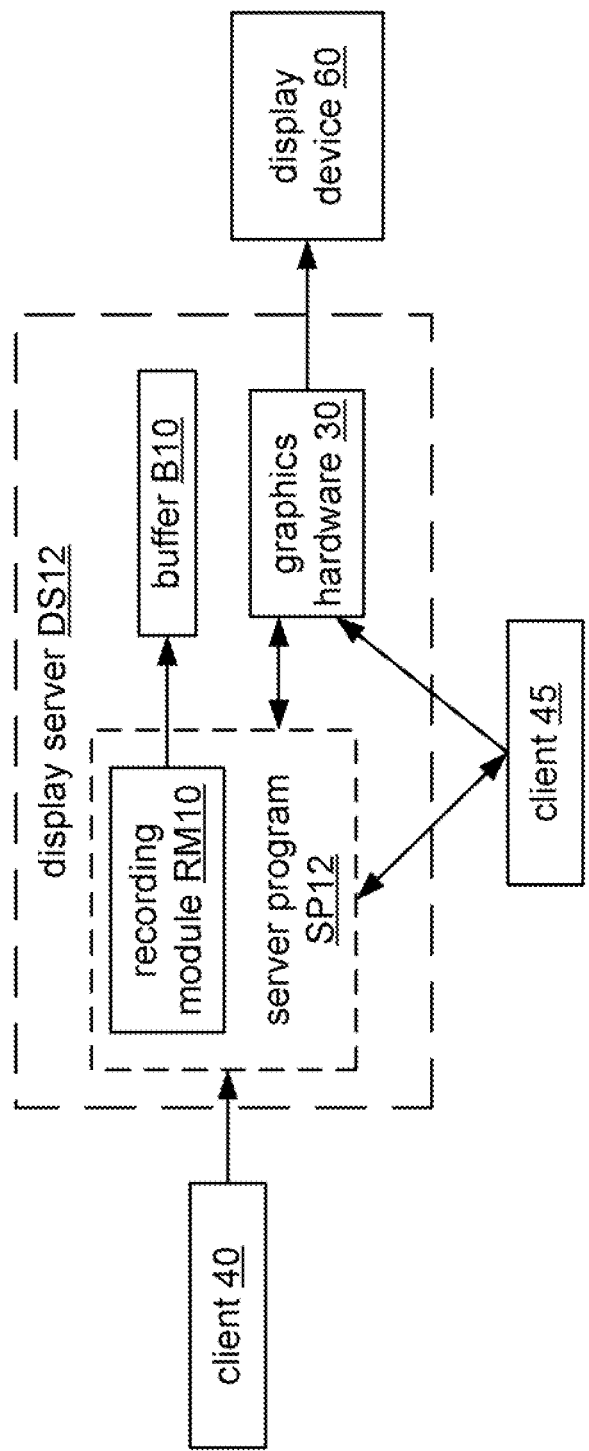
FIG. 16A shows a block diagram of a system including an implementation DS12 of display server DS10.
Figure 16B:
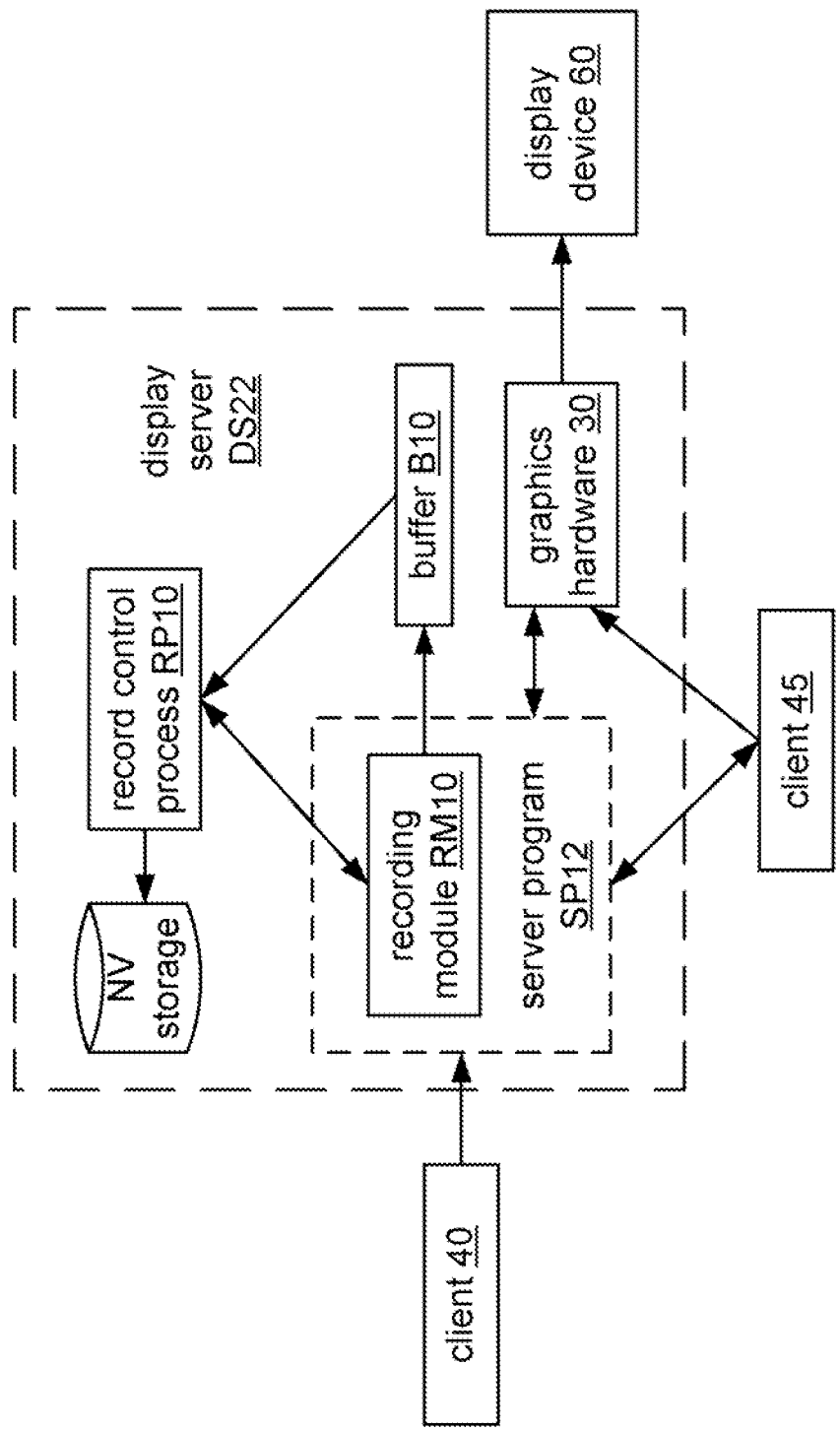
FIG. 16B shows a block diagram of a system including an implementation DS22 of display server DS20.
Figure 16C:
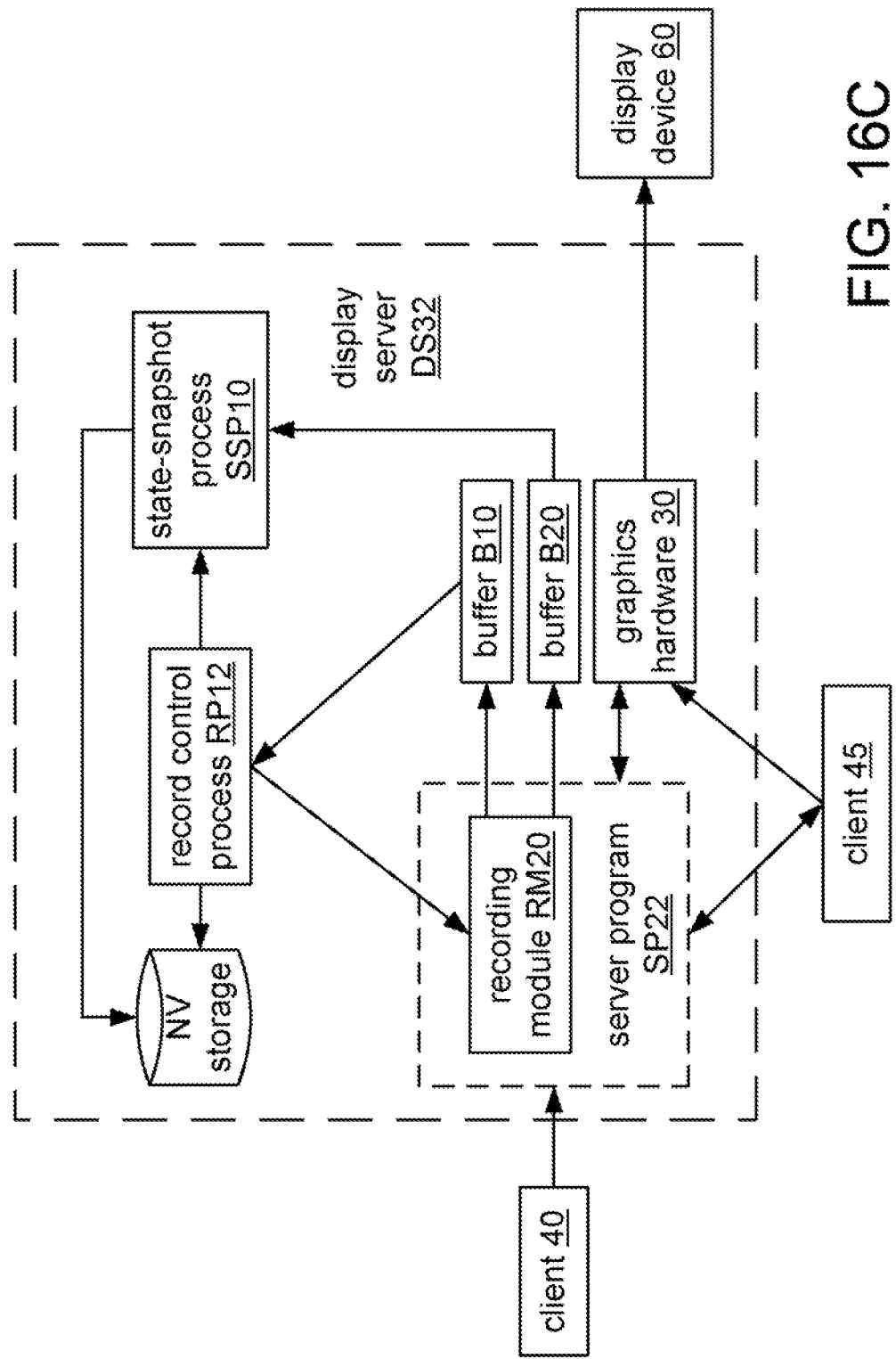
FIG. 16C shows a block diagram of a system including an implementation DS32 of display server DS30.

FIG. 16A shows a block diagram of a system including an implementation DS12 of display server DS10. Display server DS12 includes an implementation SP12 of server program SP10 that is configured to communicate with multiple clients, one or more of which may be configured to draw to the screen using commands other than standard protocol requests. In this particular case, server program SP12 is configured to communicate with a client 45 that can communicate with graphics hardware 30 other than via server program SP12. For example, client 45 may be an OpenGL client configured for direct and/or indirect rendering as discussed below. FIG. 16B shows a block diagram of a system including a similar implementation DS22 of display server DS20, and FIG. 16C shows a block diagram of a system including a similar implementation DS32 of display server DS30.

One advantage of OpenGL, even for 2-D drawing, is its ability to define display lists. A display list may include drawing commands and may also call other display lists. A display list may be stored on the host (i.e., on display server DS12) or even on graphics hardware 30. The client builds and maintains display lists by issuing commands such as "create display list" and "end display list." To re-execute all of the drawing commands on a display list, the client only needs to issue a command such as "redraw display list."

In a typical arrangement, an OpenGL client links with an OpenGL library that provides functions for OpenGL operations, and calls to an X server are made through that library. Herein, the term "OpenGL client" is also used to refer to the linked combination of an OpenGL client and an OpenGL library. Unlike other clients of an X server, OpenGL clients usually do not draw within a window by using protocol requests. A 3-D visualization typically uses many small graphics primitives and has many vertices. As each 3-D vertex is usually specified as a 32-bit floating-point number, a large amount of data would be generated in protocol requests to draw such a visualization.

Instead, OpenGL clients are typically configured to run on the same node as the X server and to draw using direct rendering. Direct rendering is a method of hardware acceleration that usually involves direct memory mapping of regions of the graphics hardware as well as the kernel drivers. Upon starting up, the OpenGL client queries the X server to determine whether it supports direct rendering. If the X server does support direct rendering, then it returns to the OpenGL library the name of a device driver to be dynamically loaded as part of the OpenGL initialization in that library. This driver typically communicates directly with the processing unit of graphics hardware 30. In a Windows operating system (Microsoft Corp., Redmond, Wash.), such a driver is called an Installable Client Driver (ICD).

Via the OpenGL library, the OpenGL client sends protocol requests to an OpenGL extension of the X server to create and destroy OpenGL windows. Such an extension may be implemented as, for example, a version of GLX, which was created by Silicon Graphics, Inc. (SGI, Sunnyvale, Calif.) and is included in versions of the X Window System produced by the X.org Foundation and the Xfree86 Project. To draw to those windows, however, the OpenGL client sends drawing commands to the OpenGL library rather than to the X server. In direct rendering, the OpenGL library writes low-level rendering commands, which correspond to drawing operations specified by the OpenGL client for the OpenGL windows, to one or more buffers. The contents of these buffers are then sent to the processing unit of graphics hardware 30 via the driver. Because direct rendering bypasses the server program to draw to the OpenGL windows, the server program does not receive any protocol requests from which the contents of those windows may be recreated.

To the X server, an OpenGL window being direct-rendered is blank and unavailable. In order to allow the X server to take control of the window for tasks such as resizing, moving, and deleting the window, the operating system layer of the X server typically includes a kernel-level driver that switches access to the window between the X server and the OpenGL client. The X server and the OpenGL client request access to the processing unit of graphics hardware 30 from the operating system via this driver.

Figure 17B:
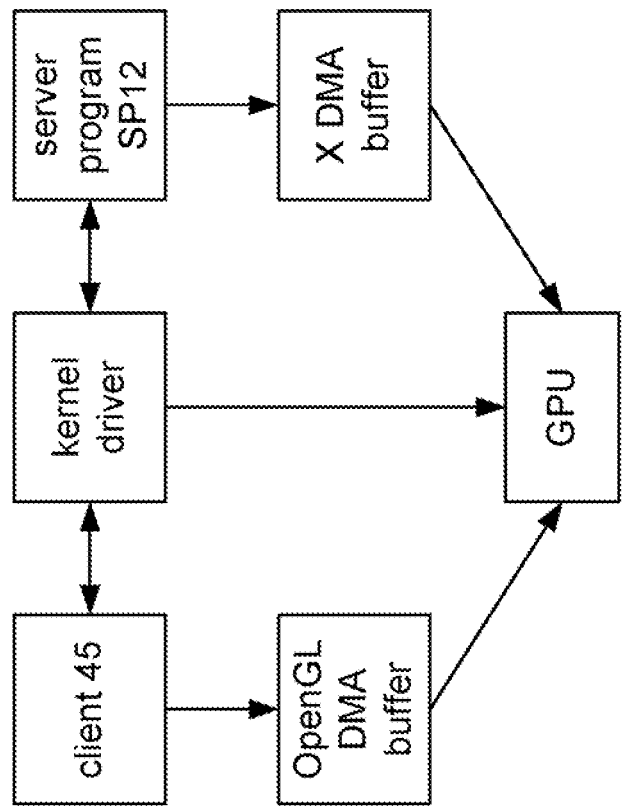
FIG. 17B shows a block diagram of an arrangement for shared GPU control.
Figure 17A:
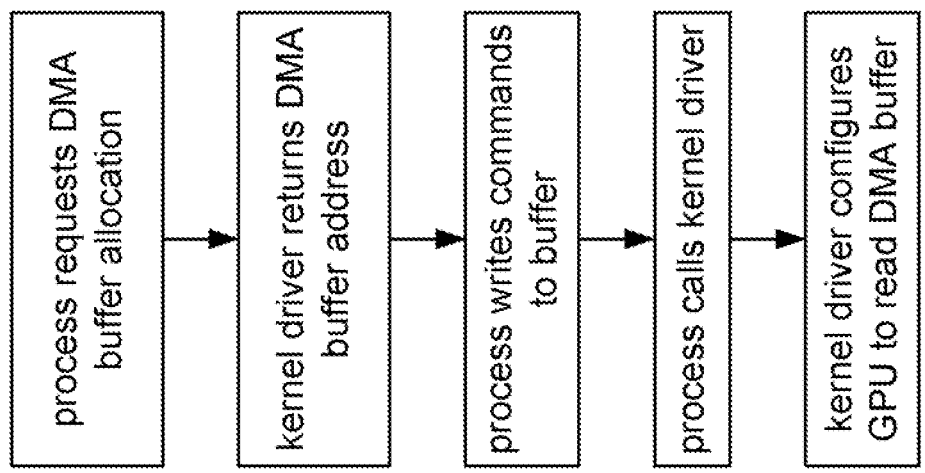
FIG. 17A shows a flowchart of a procedure for passing commands to a GPU in a shared control scheme.

FIG. 17A shows a flowchart for one example of a procedure by which a kernel driver controls access to a GPU among more than one process. In this example, a process calls the kernel driver to request allocation of a direct memory access (DMA) buffer. The driver allocates the buffer and returns its address to the calling process, which maps the buffer into its virtual memory space. The process writes rendering commands to the buffer and then calls the kernel driver to flush the buffer to the processing unit of graphics hardware 30. The kernel driver writes to the appropriate registers on the processing unit of graphics hardware 30, and the processing unit of graphics hardware 30 flushes the buffer contents to local memory. Alternatively, those registers may be mapped into the memory space of the process so that the process may write directly to them. The kernel driver may also be configured to block the server program and/or the OpenGL client from overwriting an occluding portion of a window drawn by the other process. FIG. 17B shows a block diagram of one such example of an arrangement for shared GPU control.

In an alternative mode of operation called "indirect rendering," the OpenGL library sends OpenGL commands, corresponding to drawing operations specified by the OpenGL client, to the X server encapsulated within an X protocol stream. The X server decapsulates the stream and passes the OpenGL commands to an OpenGL extension of the server program (e.g., a version of GLX), which sends them to graphics hardware 30. In such case, rather than recording the protocol stream or the decapsulated commands, it may be desired to record the rendered window as discussed herein. Indirect rendering is typically much slower than direct rendering, and an OpenGL application may not support it.

FIG. 18A shows one example of an execution flowchart for a window capture function. Task C10 performs process control (e.g., loop maintenance) such that tasks C20, C30, and C40 are performed (serially and/or in parallel) on each window in a list of windows to be captured. In one example, the window list contains an entry for each OpenGL window that currently exists. During a wrapper installation operation as discussed above, a wrapper is installed around the OpenGL extension, and when the "create window" function of that extension is called (e.g., glXCreateWindow), the wrapper function adds the new window to the window list. Similarly, when the "delete window" function of that extension is called (e.g., glXDestroyWindow), the wrapper function deletes that window from the window list.

Task C20 retrieves the contents of the current window from the display buffer of graphics hardware 30. A portion of system memory, which may be memory to which the process has access but is more typically a kernel buffer, is allocated to receive the retrieved information. A connection to graphics hardware 30 over a PCI Express bus (PCI-SIG, Beaverton, Oreg.) allows the X server (or another process executing on the host processor) to read back information from the display buffer extremely quickly. Over a PCI Express bus, the processing unit of graphics hardware 30 can perform a DMA transfer into that portion from the display buffer at speeds exceeding one gigabyte per second. Without PCI Express, it may take 30 msec or more to read back a display image of 2048×2048 pixels at a color depth of 24 bits from the display buffer. In one example, task C20 retrieves the window by specifying the window ID in a protocol request for the GetImage function (X protocol request code 73).

For a typical application such as air traffic control, readbacks from the display buffer may be done at a rate of four times per second without significant system loading, although once per second is usually sufficient, and although any other rate within the processing capabilities of the system may be used. In an application such as industrial process control, readbacks at a rate of once per second or less may be sufficient.

Server program SP10 may be configured to set up an asynchronous timer to initiate a window capture operation (e.g., according to FIG. 18A) at regular intervals. Setting up an asynchronous timer typically includes executing one or more calls to the operating system that establish a timer interval (e.g., 250 or 1000 milliseconds) and register a routine with the kernel as the timer handler. When the timer expires (e.g. when a particular time-of-day is reached), the operating system interrupts the server program to execute the timer handler routine and resets the timer. Server program SP10 may be configured to set up the timer during initialization (e.g., according to commands in the configuration file) or at runtime (e.g., according to an extension call or other command from record control process RP10). Alternatively, record control process RP10 may be configured to initiate the window capture operation according to a desired interval.

In the worst case, the window to be read back (e.g., an OpenGL window) is full-screen. For a 2048×2048 pixel window drawn at a depth of 24 color bits (8 bits for each of red, green, and blue) and 8 alpha bits per pixel (for a total of four bytes per pixel) and read back four times per second, this case would produce a representation of the window that contains 64 MB/sec of raw data.

In some cases, the retrieved information may be stored directly to disk or other nonvolatile storage. In at least some applications, however (such as a typical ATC application), the retrieved information can usually be represented in a significantly compressed form using a delta-based compression scheme, as most of the display image does not change from one retrieval to the next. In the example shown in FIG. 18A, task C30 first compresses the retrieved information, and task C40 stores the compressed information to nonvolatile storage. Task C40 may be performed by record control process RP10, which may also be configured to perform the task only when a chunk of a desired size is available for storage.

Figure 19:
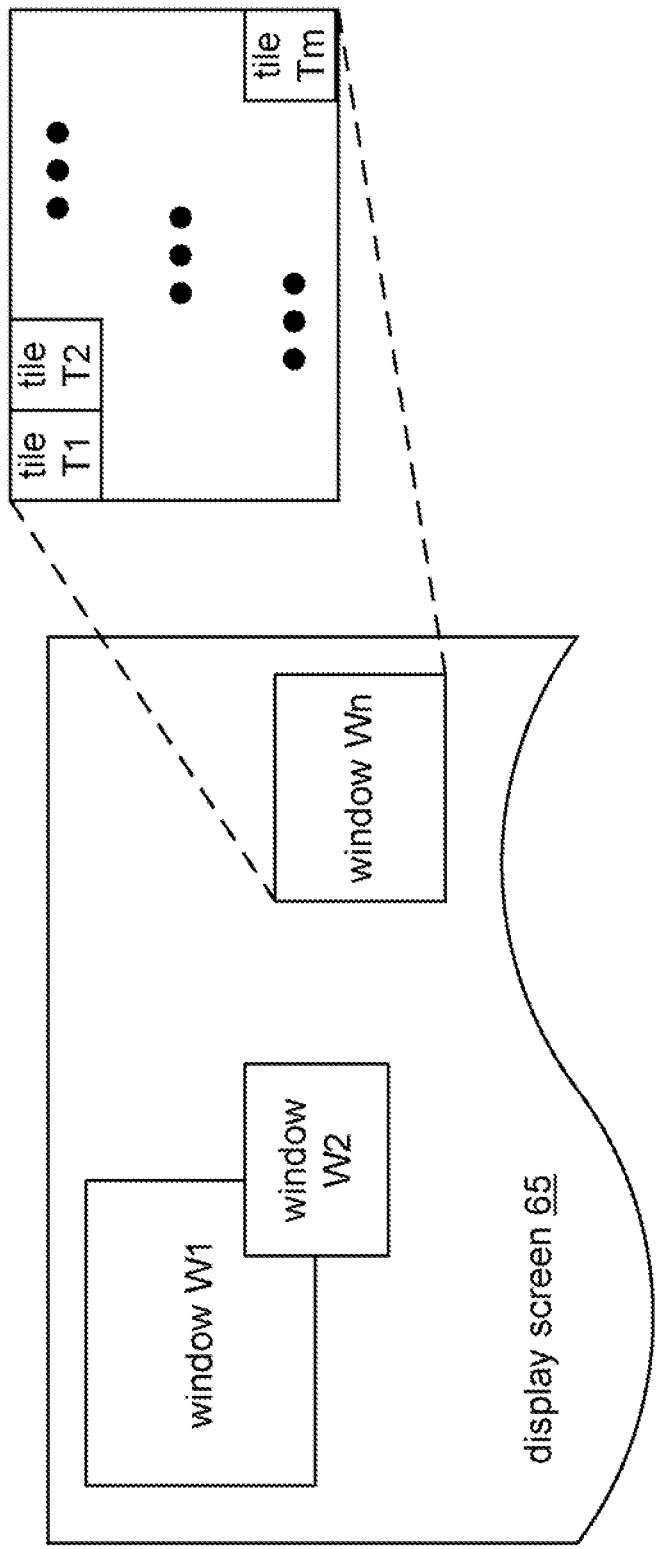
FIG. 19 shows an example of a display of windows on a screen 65 of a display device 60.

It may be useful for compression and/or occlusion detection operations to process the window to be captured as a matrix of tiles. FIG. 19 shows an example of windows as displayed on a display screen 65 of a display device 60, and a representation of a window to be captured Wn as a matrix of m nonoverlapping tiles T1 to Tm. In some applications such as air traffic control, changes to a window over time may be localized to relatively small areas, and a tile-based scheme may more efficiently separate altered areas from unaltered areas than a line-based (e.g., a row- or column-based) scheme. It may also be more efficient to retrieve the window from the display buffer as a set of tiles, at least in a case where graphics hardware 30 performs memory access operations based on units of tiles. In one example, a tile size of 16×16 pixels was found to work well, although the tiles need not be square or rectangular. A tile also need not represent a continuous area of the display screen. A tile of an interlaced image, for example, may contain pixels from alternate rather than adjacent scan lines.

FIG. 18B shows one example of an execution flowchart for a window compression routine. In this example, the routine keeps three arrays for each window to be captured (e.g., for each OpenGL window): the current window capture, the previous window capture, and a bit-mask in which each bit corresponds to a different one of the tiles in the window. For each tile of the current window capture, task CM10 compares the tile to the corresponding tile of the previous window capture. If the tiles differ, then task CM10 sets the corresponding bit in the bit-mask, and otherwise the bit is cleared (or remains cleared, for a case in which the bit-mask is reset upon initiation of the routine). For each tile, the comparison operation may be terminated as soon as any difference is found.

For the tiles corresponding to bits that are set in the bit-mask, task CM20 performs one or more compression operations. In one example, each tile is compressed using a run-length-encoding (RLE) operation, where each RLE entry includes an 8-bit count and a 24-bit RGB color. For an application in which the number of colors used to draw the image is much less than the number of available colors in the palette (for a 24-bit color depth, for example, about 16 million colors may be available), further compression may be achieved by storing the values of the colors in the image to a palette table and replacing each color in the RLE entries with a table index (e.g., an 8-bit index for a palette table of 128 colors). The reduced palette may be known in advance or may be determined from the captured window information. If it is known in advance, then the playback server program may be configured to have the same palette. Otherwise, the palette table may be stored with the compressed window information. For a situation in which a relatively small number of captured pixels do not conform to the reduced palette, these pixels may be mapped to a reserved one of the palette entries (e.g., so that they may be distinguished from the pixels that do conform to the reduced palette) and sent with their full color values.

In a current implementation applied to a typical ATC example, a window capture function as shown in FIGS. 18A and 18B executes in about 40 milliseconds for each frame. The compressed tiles of a window may also be compressed again before or during disk storage (e.g., by record control process RP10) using an operation such as, for example, the UNIX command "zlib" or "gzip". Recording of a mixture of protocol requests and display buffer captures in an application including an OpenGL client typically requires about two-and-one-half times as much storage as recording only protocol requests in a similar application without an OpenGL client.

As shown in the example of windows W1 and W2 in FIG. 19, a window may be occluded by another window. Information about occlusion of a tile may be used to skip the comparison operation for tiles that are currently occluded, with the corresponding bits of the bit-mask being set to zero. In some cases, occlusion information may even be used to avoid reading occluded tiles of the window from the display buffer. An application programming interface such as an X server typically maintains a structure describing the hierarchy (e.g., the stacking order) among the current windows that may be referenced to identify occluded tiles. In some cases, such information is also used by a direct-rendering client and/or a kernel driver (e.g., to avoid overwriting an occluding window).

Loop control, window readback, and compression operations such as C10, C20, and C30 may be implemented within recording module RM10 as extensions (or as functions of extensions) of server program SP10. It may be desirable to implement such operations together as a single window capture extension or function. A call to such an extension or extensions includes a label identifying the window, such as a set of screen coordinates or, more typically, a window ID as assigned by the server program. Initialization of a recording session may include installation of an asynchronous timer handler that is configured to initiate calls to such an extension (alternatively, to a loop control extension) according to a selected time interval (e.g., one to four times per second for each window to be captured). Alternatively, record control process RP10 may be configured to initiate a window capture operation by calling the extension according to a desired time interval. The extension stores the window information to buffer B10 and notifies record control process RP10 when a chunk is available for storage to nonvolatile storage.

Server program SP10 may be implemented such that recorded protocol requests and recorded window information are stored together in buffer B10 (i.e., in the same chunk) or to distinct sub-buffers within buffer B10. In some cases, server program SP10 is configured to store the captured windows to buffer B10, within a stream of copied protocol requests, as pseudo-protocol requests (i.e., requests directed to unused extension codes of the server program). A corresponding implementation of recording module RM10 may be configured to store, within a pseudo-protocol request to a "LoadImage" extension, information from the first readback of a window after it is created, moved, or resized. Such an implementation of recording module RM10 may be configured to store information from subsequent readbacks and compression of the window within pseudo-protocol requests to an "ImageDelta" extension. For example, information stored as a call to the LoadImage extension may include a message header identifying the message as a LoadImage request, followed by a payload including the captured window (possibly compressed according to, for example, an RLE compression that may be tile-based). In such an example, information stored as a call to the ImageDelta extension may include a message header identifying the message as an ImageDelta request, followed by a payload including the bit-mask and the compressed tiles. In such cases, an extension configured to interpret the pseudo-protocol requests may be loaded into the server program that is used to playback the recording.

In another example, server program SP10 is configured to store the uncompressed window to buffer B10 (e.g., via recording module RM10 or another extension to the server program) for processing by another process. It may also be possible for server program SP10 or another process to initiate storage of the retrieved window directly into buffer B10 without passing through server program SP10 (e.g., by passing a pointer to buffer B10 to the GetImage operation). In such cases, record control process RP10 may be configured to perform a tile-based compression operation as described above and may also be configured to store the captured windows as pseudo-protocol requests as described above. While such configurations might free server program SP10 to service its other clients, however, it is also generally desirable to minimize the amount of shared memory that is required by a process.

Compression operations tend to be processor-intensive, and the server program may be precluded from drawing while such an operation is executing. By the same token, however, the load on the server program is typically decreased in at least rough proportion to the area of the display screen that is direct-rendered, such that these two loads may balance one another.

The preceding discussion of window capture refers primarily to the example of direct- or indirect-rendered OpenGL windows. However, principles of recording protocol requests combined with window capture may also be applied to other screen recording and/or window copying situations in which recording protocol requests for some portion of the display screen is undesired and/or not possible. In addition to the OpenGL extension, for example, several other X server extensions exist for which the recording of protocol requests is either unavailable or is not a preferred mode of capturing a screen record. In one such example, a record of the output generated by a particular extension is captured for playback on a server program that does not include that extension (e.g., avoiding a need to install that particular extension on the playback server program). In these and other cases, the interpretation of some of the incoming protocol requests may require specialized hardware and/or software, and a window capture function as described herein may be used to support playback of a corresponding portion of the display image on a system that lacks the specialized hardware and/or software that was originally used to produce that portion of the display image.

A different application is used to play back the recorded protocol and other information to a server program for display. The server program used for the playback operation may be the same server program used for the recording or a different server program. In one example, the recording server program (e.g., an Xfree86, Sun X, or Xorg X server) is a different type of X server than the playback server program (e.g., an Xfree86, Sun X, or Xorg X server).

Figure 20:
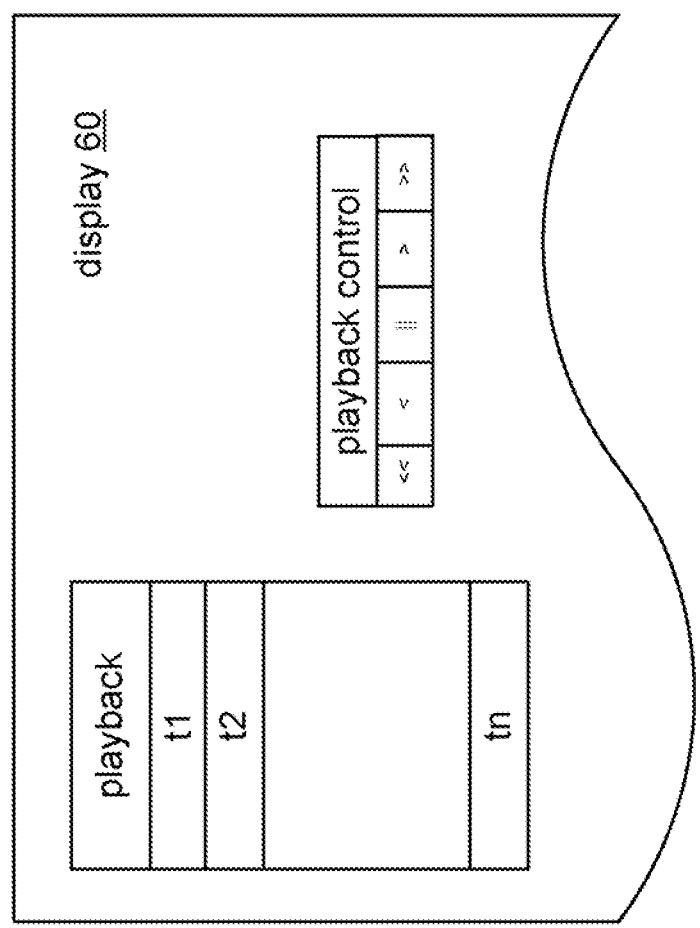
FIG. 20 shows a display of one example of a GUI for a playback application.

In one example, the playback application includes a graphical user interface (GUI). The user uses the GUI to select a particular start time or time region for viewing. For example, the playback application may present a list of the available start times (e.g., the times at which state-snapshots were recorded) from an index file, receive the user's selection, and load the state-snapshot corresponding to the selected time into the playback server program. Alternatively, the playback application may be configured to load the last state-snapshot prior to the selected region. In this case, the playback application may be configured to allow some minimum interval between the time of the snapshot and the desired time region to ensure an accurate playback (e.g., an interval of at least five seconds to allow for accurate recreation of an expose event). The playback application may also be configured to access the index file to determine the appropriate offsets in the various record files. Once the state corresponding to the selected snapshot has been established in the playback server program (e.g., the windows, window backgrounds, and off-screen pixmaps), the playback application may pause for user input or may proceed to send the recorded protocol and window captures after that snapshot to the playback server program (e.g., as changes to an initial server program state as represented by the snapshot). FIG. 20 shows a display of one example of a screen appearance of such a GUI, where t1, t2, ... tn indicate different starting times that may be selected (e.g., times corresponding to the different available snapshots) and the symbols <<, <, ||, >, and >> indicate fast reverse, reverse, pause, play, and fast forward.

The recording playback may be displayed on the same screen as the playback application GUI. Alternatively, the recording playback and the playback application GUI may be displayed on different screens of a dual-head display. In another configuration, the playback machine operates as a client, sending the recording playback to a second machine (e.g., a display server) as a protocol stream for display by the second machine.

In one example, the playback application is configured to play back the recorded protocol and window captures as rapidly as possible until the selected region is reached. When the selected time region is reached, the playback application plays back the recorded protocol and window captures according to a mode that may be selected by the user, for example: in synchronism with a real-time clock, at a slower speed, at a varying rate controlled by the user (e.g. via a shuttle or similar mechanism), or in single steps according to user input (e.g., mouse clicks or key presses).

In a typical server program context, each window and graphics context is identified by a label, and a client directs a protocol request to a particular window and/or graphics context via this label or labels. When the recorded protocol requests are played back, however, it is unlikely that the playback server program will assign the same labels to the windows and graphics contexts. Such a loss of coherency is especially likely if playback of the protocol starts at a state-snapshot (rather than from the startup of the recording server program) and/or if the playback server program is not the same as the recording server program. Therefore it may be desirable to implement the playback application to use a table to map the old window and graphics context identifiers to the corresponding new ones during playback before it forwards the protocol requests to the playback server program. The playback application may be configured to initialize such a table according to the first state-snapshot played back and may also re-initialize the table as each subsequent state-snapshot is played back.

A pseudo-protocol request may be implemented as a call to an extension that is dynamically loaded by the playback server program. In one example, the protocol record includes the captured window images in the form of pseudo-protocol requests as described herein. In another example, the captured window images are stored in another form (e.g., to a different file than the protocol requests), and the playback application generates a pseudo-protocol request to play each of the captured window images (e.g., each RLE image) back into the corresponding window according to the corresponding bit mask. For a period over which the entire display image is recorded, an initial pseudo-protocol request "LoadImage" may be executed to playback only the first screen capture, with subsequent pseudo-protocol requests "ImageDelta" being executed for each subsequent frame for playback.

Record control process RP10 may be implemented to support hot-key and/or menu-based control of the display recording operation. For example, two different hot-key combinations may be associated with initiation and termination of recording, respectively. Record control process RP10 may also be configured to support remote control of recording (e.g., by a remote supervisor, over a network, and/or via a call to an extension of server program SP10).

In some cases, record control process RP10 is implemented to include a parent process that is configured to perform control and user interface functions, and a separate recording process (e.g., a child process) that is configured to communicate with server program SP10 to carry out the operations of protocol recording and window capture. In such case, the parent process may execute for months at a time.

Operating systems typically impose limits on file size, and such a parent process may be configured to prompt the recording process to change its recording file occasionally so that the disk files do not become too large. For an implementation that includes state-snapshot process SSP10, the parent process may also be configured to call state-snapshot process SSP10 according to a selected interval or schedule and to prompt the state-snapshot process to change its recording file occasionally so that the disk files do not become too large.

Embodiments also include display servers in which the tasks of protocol recording and window capture and recording are distributed according to a different balance between factors such as server program load, operating system load, ease of implementation, portability, and memory use. For example, it may be desired to implement one or more routines as separate processes rather than as extensions to server program SP10, such as the window capture function and/or the window compression routine (e.g., to avoid interference with the responsiveness of server program SP10 to its clients).

A display server DS10 may be used in any context where replay of graphical data or efficient display recording is desired. Such contexts may include military applications, air traffic control, vessel control, industrial process control, and/or training applications. Even within a single context such as air traffic control, an implementation of display server DS10 may be used in several different ways. Air traffic management systems undergo months, if not years, of testing before being put online. Display recording can allow users testing the system to make accurate records when displays appear to be inaccurate, or when operator interactions with the display are incorrect or inadequate. Display server DS10 may be implemented to faithfully preserve all of the interactions of the operator with the various menus and windows on the display. An implementation of display server DS10 may also be used to record anomalies or other unexpected or incorrect display results for debugging server programs such as X servers.

When air traffic controllers are trained on a system that includes an implementation of display server DS10, recordings may be made to analyze proper operator use of the system. Display server DS10 may also be implemented to allow a supervisor to monitor any operator position in the system in real time. Such a capability may be used in training and/or in normal operating scenarios. Also, in times of air system emergencies, such as a crash, a hijacking, or a near-collision, a recording of the display for real-time analysis may allow critical decisions to be made much more accurately. For example, it may be desirable to review the display that was available to an air traffic controller during a sequence of events leading up to a violation of flight separation rules.

Embodiments also include methods of recording graphical display, and it is noted that such methods are expressly disclosed herein (for example, by descriptions of the operations of structural embodiments such as display servers and their elements and systems). Each of these methods, and elements such as extensions to implementations of server program SP10 and other functions and processes as described herein, may also be tangibly embodied (for example, as a computer program product in one or more computer-readable media, which may include non-transitory computer-readable media such as semiconductor or other volatile or nonvolatile memory, or magnetic and/or optical media such as a disk) as one or more sets of instructions readable and/or executable by a machine including an array of logic elements (e.g., a processor, microprocessor, microcontroller, or other finite state machine).

The foregoing presentation of the described embodiments is provided to enable any person skilled in the art to make or use the present invention. Various modifications to these embodiments are possible, and the generic principles presented herein may be applied to other embodiments as well. For example, an embodiment may be implemented in part or in whole as a hard-wired circuit, as a circuit configuration fabricated into an application-specific integrated circuit, or as a firmware program loaded into non-volatile storage or a software program loaded from or into a data storage (e.g., computer-readable) medium as machine-readable code (i.e., a computer program product), such code being instructions executable by an array of logic elements (e.g., a microprocessor or other digital signal processing unit).

One or more elements of display server DS10 and/or graphics hardware 30 may be implemented in whole or in part as one or more sets of instructions executing on one or more fixed or programmable arrays of logic elements (e.g. transistors, gates) such as microprocessors, embedded processors, IP cores, digital signal processors, FPGAs, ASSPs, and ASICs. One or more such elements may also be implemented to have structure in common, such as a processor configured to execute different portions of code corresponding to different elements at different times, or an arrangement of electronic and/or optical devices performing different operations for different elements at different times. Thus, the claims are not intended to be limited to the particular embodiments shown above but rather are to be accorded the widest scope consistent with the principles and novel features disclosed in any fashion herein.

The following portion of this description, and the corresponding figures, include additional information regarding implementations of display server 10. An implementation of display server 10 may be arranged to receive drawing requests S10 (possibly from different respective clients 40a,b) from a source external to the display server via a network interface 100. The network may be a wired network such as Ethernet over coax or twisted pair, a wireless network such as a wireless LAN, a network over another medium such as optical fiber, or a network over a combination of such media. The network may be a local-area network (LAN), a wide-area network (WAN), a campus network, or a metro-area network. Communication over the network may occur via any network protocol, such as TCP/IP or DecNET, that is deemed suitable for the application and/or medium. Communication via network interface 100 may also be compliant with one or more of the set of IEEE 802 standards (such as Ethernet or Gigabit Ethernet). Display server 10 and/or server program 20 may be configured such that the connection is encrypted. Alternatively or additionally, server program 20 may be configured to service requests from client 40 only after successful execution of an authorization procedure such as verifying a "magic cookie."

Communications between a server program and different clients may be conducted over the same network or over different respective networks. Connection over different networks may provide additional redundancy against failure (e.g., breakage) of a physical transmission medium. In such case, display server 10 may include more than one network port (and, for example, more than one RJ-45 socket or other network connector).

In a typical application, clients are not aware of one another, and access to a shared network may be arbitrated at a physical level, such as by collision detection. An implementation of display server 10 that supports connections to multiple networks (via a network interface 110, for example) may be configured to receive drawing requests from different clients simultaneously.

In some cases, a server program 200 may receive drawing requests from a client program executing on one machine (an application server) and associated data from a client program executing on another machine (a data server).

Network interface 100 may include a network port (e.g., a 10/100/1000 BaseT port) that carries drawing requests from more than one client 40 and/or for more than one server program 200. For example, network interface 100 may be implemented as a network port according to the implementation P12 shown in FIG. 21A. Network port P12 includes a logical interface configured to convert data between serial and parallel forms. In a typical application, communication with the network is conducted in a serial fashion, via a device such as a universal asynchronous receiver/transmitter (UART), while data is exchanged with other elements of the display server in parallel (e.g. in bytes). Network port P12 also includes a physical interface to the network medium. The physical interface may include devices such as serial line drivers and/or impedance-matching components. Depending on the transmission medium, the physical interface of a network port may also include devices to perform conversion to and/or from radio-frequency or light (for example, modulation and/or demodulation of one or more carrier frequencies), an antenna, and/or a connector such as an RJ-45 socket or fiber-optic connector.

Figure 21A:
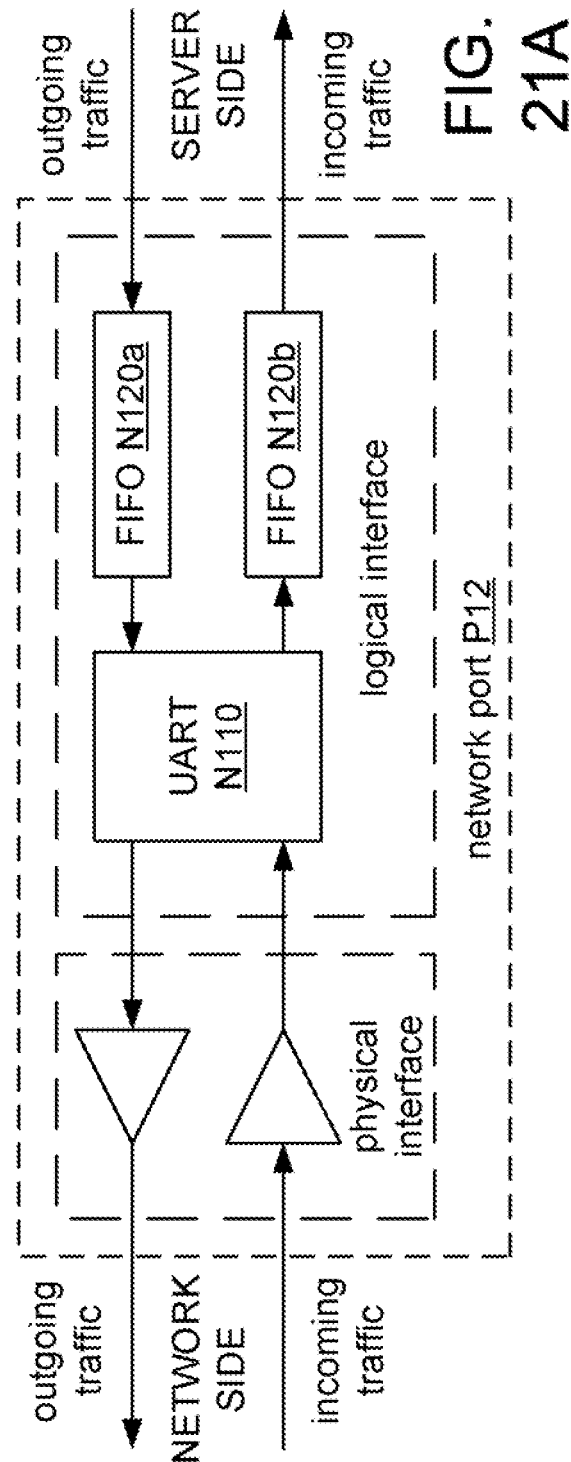
FIG. 21A shows a block diagram of a network port P12.

As shown in the example of FIG. 21A, a network port may be bidirectional. For example, it may be desirable for display server 10 to receive drawing requests and also to transmit information such as input events (keyboard and/or mouse input) to one or more clients. Network port P12 may be implemented as a network interface card, such as an expansion card configured to plug into a bus such as a PCI, PCI Express, AMR, VME, ISA, PC-104, or other standard or modified bus.

Figure 21B:
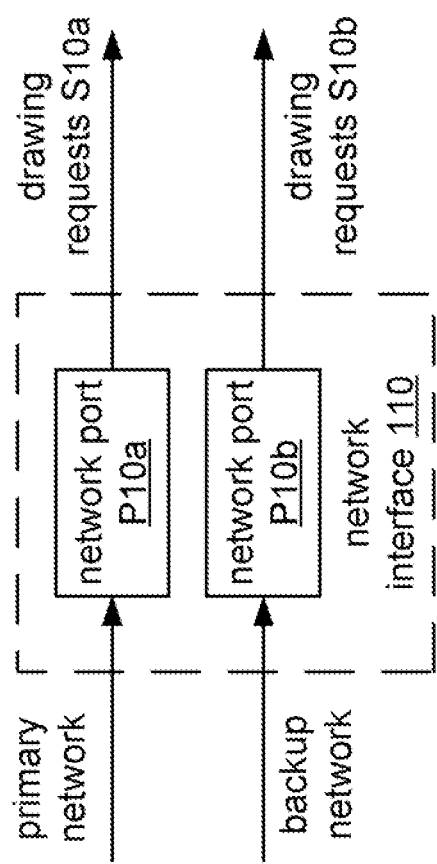
FIG. 21B shows a block diagram of an implementation 110 of network interface 100.

Alternatively, network interface 100 may include more than one port. In an application where the network includes a physical medium such as wire or optical fiber, for example, it may be desired to deploy two or more separate (e.g. redundant) networks. In such an installation, communications may continue over one network even if the medium of another network fails (e.g., a network cable breaks or is cut). FIG. 21B shows a block diagram of an implementation 110 of network interface 100 that includes two network ports P10a and P10b, one or both of which may be implemented according to the bidirectional example P12 of FIG. 21A. Each such port of the network interface may be implemented as separate hardware, such as separate expansion cards. Alternatively, the ports may be implemented to operate as separate logical entities that share hardware such as a chipset or UART.

Figure 22:
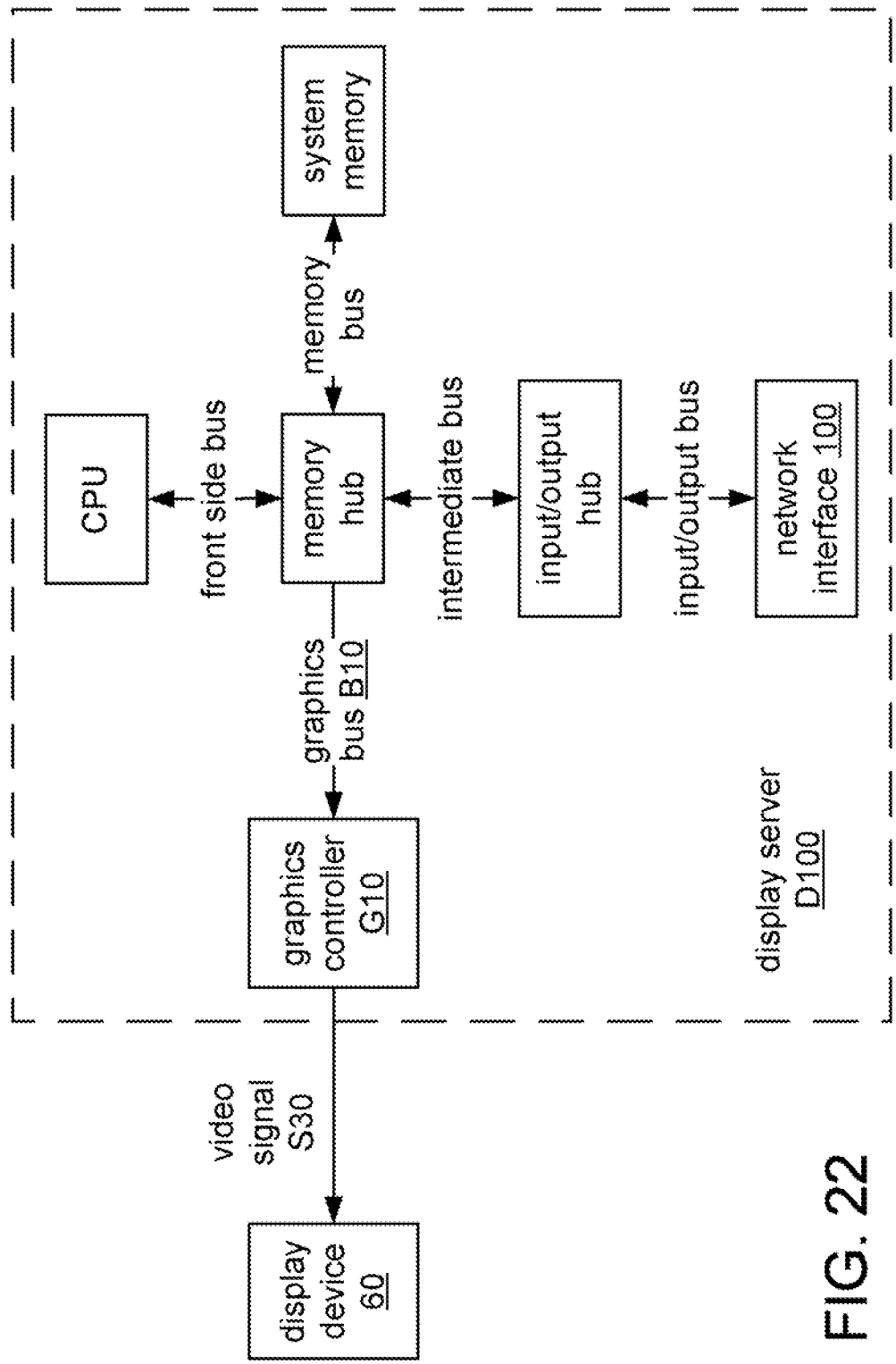
FIG. 22 shows an example of an architecture for a computer system including an implementation of display server D100.

FIG. 22 shows an example of the hardware system architecture for a typical implementation D100 of display server 10. As shown in FIG. 22, this implementation includes a central processing unit (CPU) configured to execute server program 20. The CPU may be implemented as a single-core or multicore processor (as manufactured by, for example, Intel, IBM, Advanced Micro Devices (AMD), or Sun Microsystems) and may also be configured to execute other programs such as an operating system of display server D100. In another example, the CPU includes two or more processors sharing a common operating system and system memory. Other embodiments include arrangements in which the CPU is an embedded processor, such as an IP core (as designed by, for example, ARM or MIPS) programmed into an array such as a field-programmable gate array (FPGA).

The CPU as shown in FIG. 22 is configured to communicate with a memory hub over a high-speed front side bus (FSB). Common terms for various implementations of the memory hub include a Northbridge, a graphics and memory controller hub (GMCH), a system controller, and a system platform processor (SPP). In a typical implementation, the memory hub communicates with the system memory over a standard memory bus interface such as double data rate (DDR), DDR2, or RDRAM (Rambus).

The memory hub as shown in FIG. 22 also communicates with an input/output hub over an intermediate bus. Examples of technologies that may be used to implement the intermediate bus include HyperTransport™ (AMD), VLink™ (Via), and Hub Link (Intel). Common terms for various implementations of the input/output hub include a Southbridge, a peripheral bus controller, an input/output controller hub (ICH), and a media and communications processor (MCP). The input/output hub communicates with devices such as a network interface via an input/output bus such as PCI, PCI Express (PCI Special Interest Group, Portland, Oreg.), or VME. Other devices that may be connected to the input/output bus include magnetic and/or optical disk storage; removable storage (such as a USB or Firewire device); and an authentication unit such as a removable key device, a fingerprint or other biometric reader, or another type of access control device such as a keypad or card reader.

In this example, a graphics bus B10 carries communications between the memory hub and the graphics controller G10. Graphics bus B10 may conform to a specification such as a version (e.g. 1x, 2x, 4x, 8x, and/or Pro) of Accelerated Graphics Port (AGP) or a version of PCI Express. Graphics controller G10 may be implemented as an expansion card configured to plug into a bus of display server D100 (such as an ISA, VESA, VME, PCI, PCI Express, or AGP bus), as an integrated chip or chipset that is affixed to a system board, and/or as a device that is incorporated into another chip or chipset, such as a Northbridge, Southbridge, or CPU. In some cases, for example, the memory hub is implemented as an integrated graphics processor (IGP) that includes a graphics processing unit (GPU).

Graphics controller G10 includes a processing unit 310 configured to execute rendering commands S20a,b and to output corresponding rendered pixel values. For example, processing unit 310 may be configured to store the rendered pixel values to display buffers in local or system memory. Processing unit 310 may be a graphics processing unit (GPU) as manufactured by 3Dlabs, Nvidia, or ATI or another SIMD or vector processing unit. Some GPUs may also be referred to as visual processing units (VPUs). In one implementation, graphics controller G10 includes a P20 GPU (3DLabs, Milpitas, Calif.). Display server D100 may be implemented for virtually any current or future GPU instruction set, GPU architecture, and/or graphics card or subsystem architecture (e.g. AGP or PCI-Express expansion card).

Figure 23A:
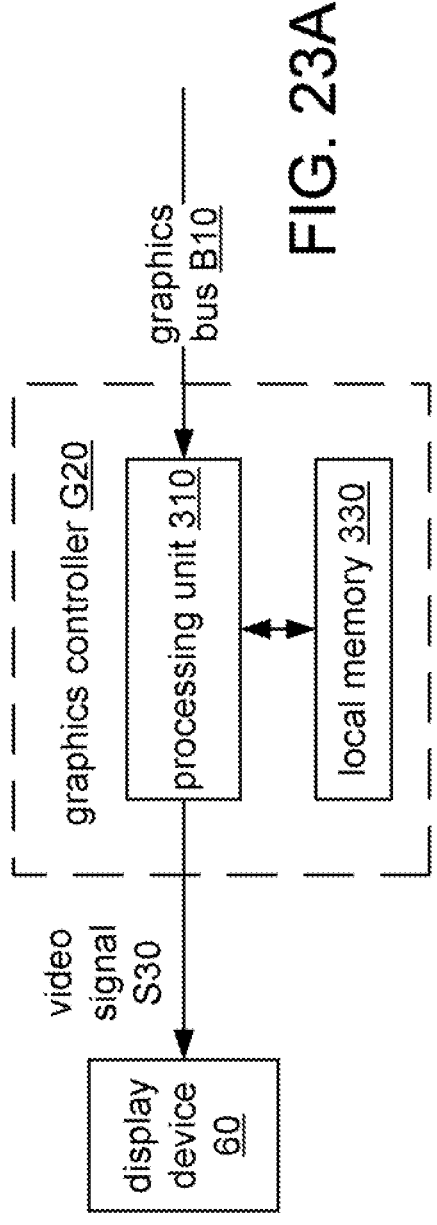
FIG. 23A shows a block diagram of an implementation G20 of graphics controller G10.

FIG. 23A shows a block diagram of implementation G20 of graphics controller G10 that includes a local memory 330. As used herein, the term "local memory" refers to memory that meets at least one of these two criteria: (A) memory that is integrated within a chip or chipset of graphics controller G20 and/or is onboard an implementation of graphics controller G10 that is separate and removable from a mainboard of display server D100 (e.g. an expansion card) and (B) memory that is directly addressable only within graphics controller G20 and not by the system CPU and/or any device on the other side of graphics bus B10. In a typical implementation, local memory 330 meets both criteria, although in some such cases local memory 330 may be indirectly accessible from the system side of graphics bus B10. In the example of FIG. 23A, processing unit 310 is configured to retrieve rendering commands from local memory 330 and/or to store values of rendered pixels to local memory 330. Information stored in and/or retrieved from local memory 330 may also indicate display configuration parameters such as bit depth and screen size in pixels.

FIG. 23B shows a block diagram of implementation G22 of graphics controller G20 that includes a display interface 320 configured to produce a video signal S30 based on pixel values. At a specified time (for example, according to a frame rate of video signal S30), processing unit 310 reads the rendered pixel values from a portion or portions of local memory 330 to be displayed and outputs the pixel values to display interface 320, which produces a corresponding video signal S30. Display interface 320 may produce video signal S30 at a fixed (synchronous) or variable frame rate, typically in the range of from 60 to 90 Hertz.

FIG. 23C shows a block diagram of an alternate implementation G24 of graphics controller G20 in which display interface 320 receives the pixel values from local memory 330 rather than via processing unit 310. In this example, processing unit 310 writes values of rendered pixels to local memory 330, and display interface 320 reads the pixel values from local memory 330 (for example, according to a frame rate) and produces video signal S30 based on the pixel values. In this case, display interface 320 may include scanout logic configured to scan one or more storage areas of local memory 330 such as display buffers.

Display interface 320 is configured to produce video signal S30 as a series of video frames, each video frame of the series representing a screen image scanned out from pixel value storage. As noted above, the frame rate may exceed the image refresh rate, such that display interface 320 may scan out the same screen image two or more times for consecutive video frames in the series. Video signal S30 also includes a periodic signal that indicates a frame boundary between each consecutive pair of the series of video frames. The frame boundaries define frame periods of substantially equal duration, with each video frame in the series being scanned out during a corresponding one of the frame periods.

For a case in which video signal S30 is an analog signal (e.g. a composite video signal), the periodic signal is a vertical synchronization signal which indicates the start and/or end of each frame and has a frequency equal to the frame rate of display signal S30. In this case, video signal S30 may also include a horizontal synchronization signal, which indicates the start and/or end of each line of the frame. For a case in which video signal S30 is a digital signal (e.g. a DVI-D signal), the periodic signal is a special character that appears periodically in the video signal and identifies the top of each frame (vertical synchronization signal). In this case, video signal S30 also typically includes a pixel-level clock as well as other special characters that appear periodically in the video signal and identify the bottom and the left and right sides (horizontal synchronization signal) of each video frame.

Display interface 320 may include at least one cathode-ray tube controller (CRTC) configured to produce a monochrome or color (e.g. RGB) analog video signal. Alternatively or additionally, display interface 320 may be configured to produce at least one Digital Video Interface (DVI) signal (e.g. for a flat-panel display device) and may support a single- or dual-link DVI signal. Examples of typical sizes for video signal S30 include 1024×768, 2048×2048, 2560×1600, 2560×1920, and 3480×2400 pixels. Display interface 320 may also be configured to perform operations such as digital-to-analog conversion, horizontal/vertical scan signal generation, and/or gamma correction. Display interface 320 may be included within at least some implementations of processing unit 310. Alternatively, display interface 320 may be otherwise included within a chipset of graphics controller G10 or provided separately within graphics controller G10.

Figure 24:
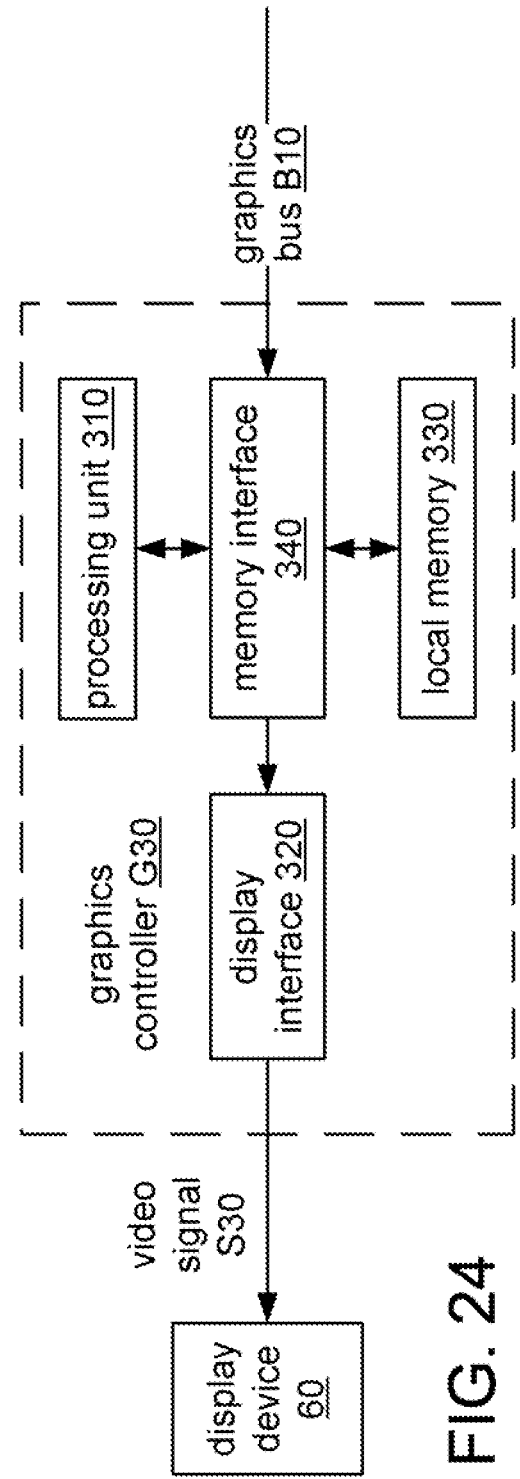
FIG. 24 shows a block diagram of an application of an implementation G30 of graphics controller G20.

FIG. 24 shows a block diagram of an implementation G30 of graphics controller G20. Controller G30 includes a memory interface 340 configured to arbitrate data transfer between local memory 330 and other elements of graphics controller G30, such as processing unit 310 and display interface 320. Memory interface 340 may also be configured to arbitrate data transfer between local memory 330 and devices on the other side of graphics bus B10, such as the CPU and/or system memory. Memory interface 340 may be configured to perform transfers to and/or from local memory 330 via direct memory access and/or may be configured to include scanout logic to provide pixel values to display interface 320.

Memory interface 340 may be included within at least some implementations of processing unit 310. For example, one or both of memory interface 340 and display interface 320 may be integrated into the same chip as processing unit 310. Alternatively, memory interface 340 may be otherwise included within a chipset of graphics controller G10. For example, memory interface 340 and display interface 320 may be integrated into the same chip of such a chipset.

Display server D100 may be configured to support a flow of rendering commands to graphics controller G10 via graphics bus B10, as indicated by the arrows in FIGS. 22-24. In at least some implementations of display server D100, graphics controller G10 is also configured to transmit information to system memory over graphics bus B10 (i.e. in the opposite direction). Such transfer may be performed using an address remapping scheme such as an aperture.

The portion of memory that is scanned out for display may be selectable. Different screen images may be rendered for one client 40 or server program 200, for example, and it may be desired to select among these images for display. In a double buffering configuration, it may be desired for the scanout operation to switch between alternate portions of a display buffer at a fixed or variable rate (e.g. upon an event such as an indication from a server program 200 or processing unit 310 that rendering of a frame to one of the portions has been completed). As described herein, graphics controller G10 may also be configured to redirect the scanout operation from one portion of memory to another according to the state of a display context signal S50, which state may correspond to a visible one of server programs 200a,b. Alternatively, graphics controller G10 may be configured such that a particular portion of memory is reserved to be scanned out, with processing unit 310 and/or memory interface 340 being configured to store the rendered pixel values of the screen image to be displayed into this portion of memory.

Figure 25:
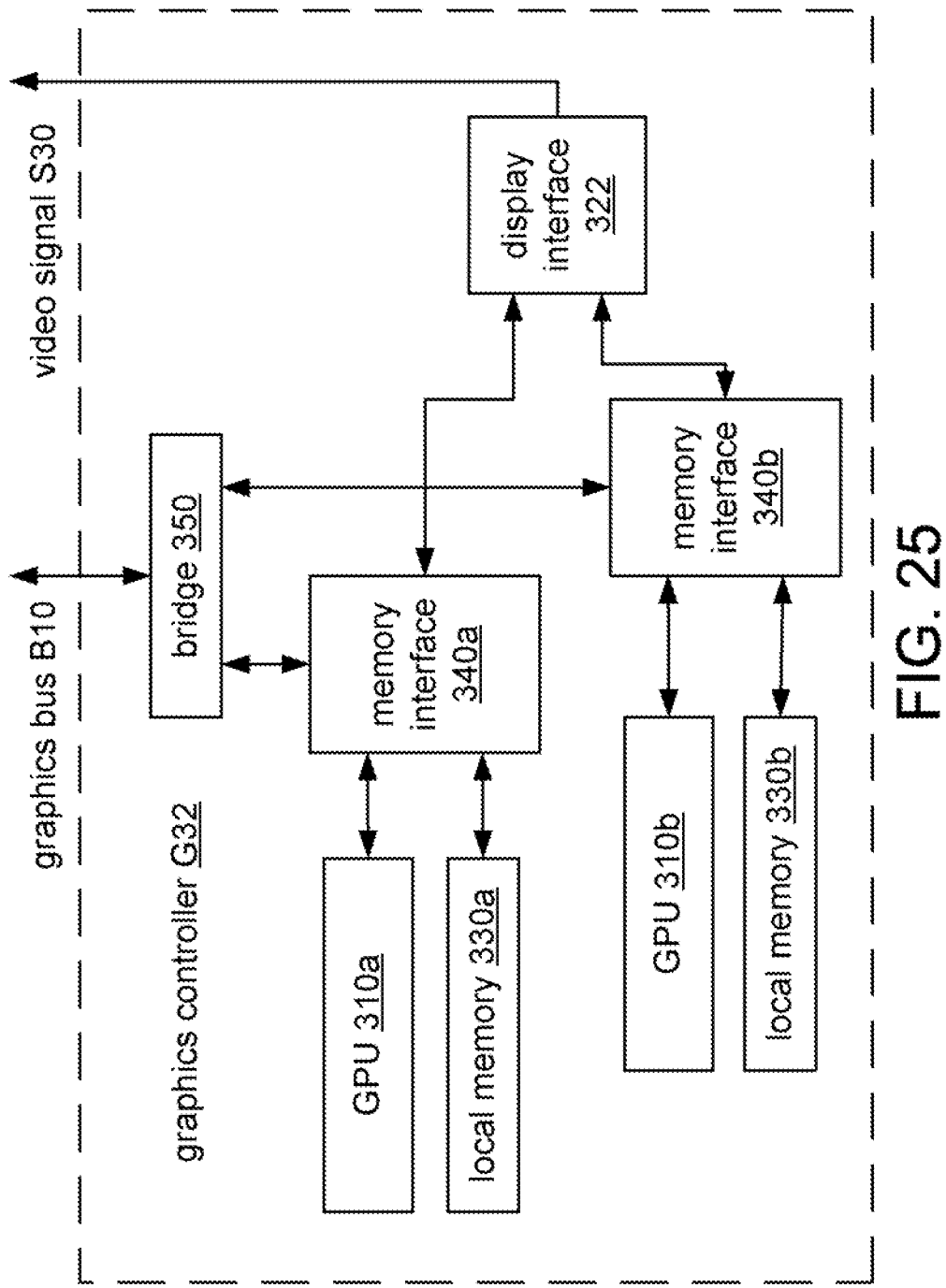
FIG. 25 shows a block diagram of an implementation G32 of graphics controller G30.

In a typical implementation of display server D100, graphics controller G10 includes one processor, such as a GPU. In some cases, graphics controller G10 may include more than one processor, possibly on the same expansion card. FIG. 25 shows a block diagram of one such implementation G32 of graphics controller G30, in which each GPU 310a,b is configured to execute a different set of rendering commands. Bridge 350 is configured to arbitrate data transfer between a local memory space of graphics controller G32 and devices on the other side of graphics bus B10, such as the CPU and/or system memory. Within the local memory space, each GPU 310 is configured to access a corresponding one of local memories 330a,b, which may be implemented as different portions of the same array of storage elements or as physically separate arrays (e.g. chips).

In the example of FIG. 25, each processor 310a,b may be dedicated to executing rendering commands from a corresponding server program 200. Alternatively, each processor 310a,b may be configured to execute rendering commands from more than one of the server programs 200. In such case, each processor may be configured to render alternate scan lines or separate sets of scan lines of each frame (also called "split frame rendering"), or to render alternate frames, or to execute rendering commands associated with different graphics primitives of the same frame. Depending upon the rendering configuration, it may be desired for implementation 322 of display interface 320 to display pixel values from one or both local memories 330 at each frame. Further embodiments of display server D100 include a graphics controller having two or more processors 310 (possibly on separate expansion cards) that share a video memory space via an interface such as Scalable Link Interface (SLI) (NVIDIA Corporation, Santa Clara, Calif.). It is expressly noted that the term "processing unit," as it appears herein and in the claims in reference to an element configured to produce pixel values, is defined to encompass a configuration of multiple processors (e.g., GPUs) operating in a coordinated fashion to produce pixel values of frames of a video signal.

A display server D100 includes a server program 20 configured to process drawing requests and to produce corresponding rendering commands. A drawing request is a device-independent command or sequence of commands to draw a graphics primitive to an image. A rendering command is a device-specific command or sequence of commands to render pixel values to a storage area such as a display buffer. Server program 20 may also be configured to issue replies to clients and/or to send information to clients such as information received from an input device 50.

Server program 20 executes on the CPU of display server D100. A server program is typically implemented as a user process, which executes in user space as opposed to processes (such as the operating system kernel, kernel extensions, and kernel-mode drivers) that execute in kernel space. The distinction between user space (also called application space or user level) and kernel space is well-known in the art and is maintained by the operating system of a device. Operating system 80 may be arranged to configure server program 20 according to options specified in a configuration file.

A server program 20 typically includes device-independent code and device-dependent code. For example, a server program 20 may be implemented as an "X server," or a server program based on a reference implementation of the X Window System (X.Org Foundation, a Delaware LLC). Common versions of the X Window System include X Consortium Standard X Version 11 ("X11") and Release 6.3 ("X11R6.3"), X.Org Release 6.8.2 ("X11R6.8.2"), and versions released by the XFree86 Project, Inc. An X server provides network-based display services to clients and may also respond on behalf of clients to user interface events (such as mouse and/or keyboard input) and protocol requests (graphics). In one example, client programs are implemented as X clients, each executing on one or more processors (possibly two or more executing at least in part on the same processor).

FIG. 26 shows a diagram of the layered architecture of a typical X server. The device independent (DIX) layer handles communications with clients (via the X protocol) and manages one or more queues of events such as incoming drawing requests and outgoing input events. The DIX layer includes functions that do not depend on the graphics hardware, input devices, or operating system, and code in the DIX layer is common to implementations of the X server on different platforms. A typical X server also includes an extension interface, which may be used to extend the operation of the X server to include functions that are not present in the core X protocol.

The device dependent (DDX) layer shown in FIG. 26 communicates with the DIX layer and includes code that may differ from one platform to another, depending on graphics controller G10 and/or an operating system of display server D100. The DDX layer includes instructions specific to the graphics hardware, such as a write of a particular value to a particular register in order to perform an operation such as drawing a line, and may be developed based on the manufacturer's documentation for graphics controller G10 (e.g. the instruction set of processing unit 310). The DDX layer may be tailored to include features for a particular market and application, such as enhanced 2D performance, and may be adapted to any type of graphics hardware. The DDX layer may also be configured to relay input events to the DIX layer. In some cases, the DDX layer may be implemented as one or more separable components of server program 200, such as a loadable module. For example, the DDX layer may include one or more device drivers and/or libraries, which may be supplied by a manufacturer of graphics controller G10.

In another example, the device-independent portion of server program 20 includes an application programming interface (API) configured to process DirectX commands (for example, DrawPrimitive) and/or OpenGL commands (for example, GL_TRIANGLE, GL_QUAD). In such case, the device-dependent portion of server program 20 may include routines that are specific to graphics controller G10 and/or processing unit 310, such as a device driver.

Communication between network interface 100 and server program 20, such as the transfer of drawing requests and/or input events, may occur via an operating system 80 of display server D100. For example, a connection between a client and server program may be set up and implemented via calls to a kernel or service of operating system 80. FIG. 27 shows a block diagram of an implementation D120 of display server D100 that illustrates transfers of drawing requests from network interface 100 to server program 20 via operating system 80, which may be implemented as Linux or another variant of Unix, Windows XP or another version of Microsoft Windows, Tiger (MacOS X) or another version of a Macintosh operating system (Apple, Cupertino, Calif.), or another operating system. For example, such transfers may be performed via a kernel driver or similar service.

As shown in FIG. 26, server program 20 may include a layer configured to interface with operating system 80. This operating system layer may be implemented to include code which relies on operating system 80 and differs for different operating systems. The operating system (OS) layer of an X server handles procedure calls and communication with other processes via operating system 80 and may also manage connections between server program 20 and one or more clients 40. The OS layer may also include routines for allocating memory to server program 20.

A server program 20 may be implemented to operate in a rooted configuration or a rootless configuration. In a rooted configuration, the server program controls drawing of the top level desktop. For example, display server D 100 may be implemented such that server program 20 controls drawing of the top level desktop. In a rootless configuration, another application controls the desktop, such as a display manager. Examples of display managers, which may communicate with X servers via a version of the X Display Manager Control Protocol (XDMCP), include X display manager (xdm), KDE display manager (kdm), and gnome display manager (gdm).

A server program 20 may be implemented such that it has no knowledge of primitives it has already drawn. In such case, a server program may be configured to redraw each frame rather than indicating changes to a previously drawn frame. Persistence of a background (such as a map) from frame to frame may be obtained by the use of one or more overlay planes, which may be cleared for a new image without affecting the background.

Delivery of rendering commands S20 to graphics controller G10 for execution may occur by any path or procedure suitable for the particular implementation of display server D100. Typically, a server program 20 is configured to store rendering commands to system memory, and the rendering commands are then copied to local memory 330 for execution by graphics controller G10. For example, a server program 20 may store rendering commands to a command buffer in system memory, with contents of the buffer being copied periodically (e.g. via memory interface 340) to a command buffer in local memory 330. One or both of these buffers may be implemented as a circular queue (also called a circular buffer or ring buffer). Copying of rendering commands may be initiated upon a specified fill condition of the buffer in system memory and/or of the buffer in local memory 330.

Writing of the rendering commands to local memory 330 (e.g. via memory interface 340) may occur individually or in blocks and may be performed via operating system 80. For example, graphics controller G10 and/or a central processor of display server D100 may initiate a transfer by calling a function of operating system 80. Such a call may include a request to invoke a particular interrupt vector, causing a read from (and/or a write into) a buffer associated with that vector. It may be desirable to transfer the rendering commands into local memory via a direct memory access (DMA) operation and/or one or more intermediate buffers such as a paging buffer. FIG. 27 shows an example of a logical architecture of paths for data transfer via operating system 80 among server program 20, network interface 100, and memory interface 340. FIG. 28 shows an example of a virtual path of data transfers across such an implementation D140 of display server D110 including operating system 80.

Alternatively, graphics controller G10 may obtain rendering commands S20 by accessing system memory. Such access may occur over a PCI, PCI Express, or AGP bus via an aperture mechanism such as a Graphics Address Remapping Table (GART), which translates virtual addresses referenced by graphics controller G10 into physical addresses in system memory. Graphics controller G10 may be configured to execute rendering commands directly upon reading them or to store the rendering commands to a command buffer in local memory 330.

It may be desirable for a display buffer to occupy a contiguous portion of memory, which may simplify a scanout operation by display interface 320. Traditionally, a display buffer was arranged as a linear array, with blocks of values corresponding to successive screen lines being stored one after the other. For throughput efficiency, one or more of the display buffers may be arranged as rectangular tiles instead, with each tile representing a two-dimensional block of pixels (e.g. 8×8 pixels). If a scene being rendered includes many small primitives, accessing the memory as tiles may greatly reduce the total amount of memory traffic needed to render the scene, because a single tile may contain an entire primitive. Tiles need not be rectangular, and tile size and shape may be selected according to factors such as expected size and shape of a graphics primitive and the physical configuration of the local memory (e.g. size and shape of the display area corresponding to a portion of the memory that may be accessed in one operation). Otherwise, the notion of display buffers is a logical abstraction, and such buffers may be physically located, maintained, and transferred in a manner suitable to any technique of memory management and allocation used by processing unit 310, memory interface 340, display interface 320, and/or other components of display server D100.

Command and display buffers may reside in the same physical and/or logical memory, or in different physical and/or logical memories. For example, the display buffers may reside in on-board memory, while the command buffers reside in on-chip memory. Embodiments of display server D100 include configurations in which the display buffers reside in memory dedicated to the graphics controller, configurations in which the display buffers reside in system memory, and configurations in which the display buffers may reside in either or both memory spaces. Other embodiments include the use of a Unified Memory Architecture (UMA), in which the CPU and processing unit 310 share one memory space.

Figure 29:
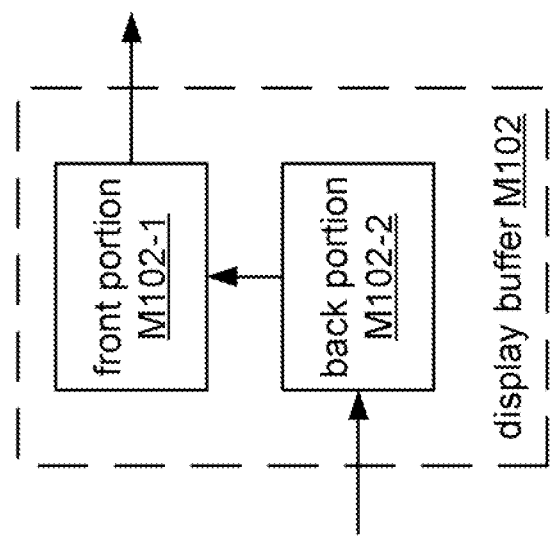
FIG. 29 shows a block diagram of an implementation M102 of display buffer M100.

Display buffer M100 may support double buffering, in which an on-screen buffer is scanned out for display (e.g. by display interface 320 or memory interface 340) while pixels of the next frame are rendered to an off-screen buffer. FIG. 29 shows an implementation M102 of display buffer M100, which includes a back portion to which the image is rendered and a front portion which is scanned out for display. Graphics controller G10 and/or processing unit 310 may be configured to copy the contents of the back portion to the front portion after each frame scan is complete (for example, during a vertical retrace period), upon completion of the image being rendered, or according to some other procedure synchronized to the scanning operation. Such a transfer may be executed by memory interface 340 via a fast operation such as a bit-block transfer (or "blit") and/or a direct memory access operation. A double-buffering operation may also be configured to copy to the front portion only areas of the back portion that have changed from the previous frame, which may reduce memory bandwidth consumption.

In the example of FIG. 29, the back portion is always off-screen. In another implementation, the rendering and scanning operations are synchronized to alternate at each frame between two portions of display buffer M100, such that a frame rendered off-screen to one portion is then scanned out from the same portion while the next frame is being rendered off-screen to the other portion.

As discussed above, graphics controller G10 and/or processing unit 310 may read rendering commands stored in one or more command buffers and store rendered pixel values to one or more display buffers. Graphics controller G10 and/or processing unit 310 may also be configured to read rendered pixel values, masks, and/or overlays from (and/or store such information to) one or more off-screen areas or "workspaces." Client programs typically issue requests to draw portions of more complex images to off-screen surfaces, which are called "pixmaps" in X Window System terminology. Once an image portion is complete, it may be copied from the off-screen pixmap to an appropriate area of a display buffer for scanout. Drawing to off-screen memory may help to minimize effects of flicker or flash during the erase or redraw, and it may be desired to assemble entire display frames from images rendered off-screen in this manner.

Image portions stored to the workspace may include one or more overlay images, and an image for display may be assembled from a background image and one or more overlay images applied to the background as planes or masks. In an air traffic control application, for example, images indicating such information as locations and identities of aircraft may be overlaid on a background image of a map. The cursor image is also typically implemented as an overlay. In some cases, different clients may generate the drawing requests used to create the background and the overlay.

In some applications, the amount of data to be viewed at one time may be greater than the amount of real estate available on the display. For example, the amount of data to be displayed may exceed the ability of a single display screen to intelligibly convey that information to the operator at one time. Although operations could be done to allow viewing of all of the data, such as providing the operator with the ability to switch between multiple windows and/or to pan the visible window across a larger virtual display window, still such operations would not allow all of the data to be seen at any one time. In such cases, more than one display device 60 may be used at a work position. For example, a seat in an air traffic application may include one large display that shows the changing positions of the aircraft being tracked, and another display (possibly of lower resolution) that shows text-oriented data such as flight strip and/or weather information. In some cases, it may even be desirable for a work position to have three or more displays.

Figure 30A:
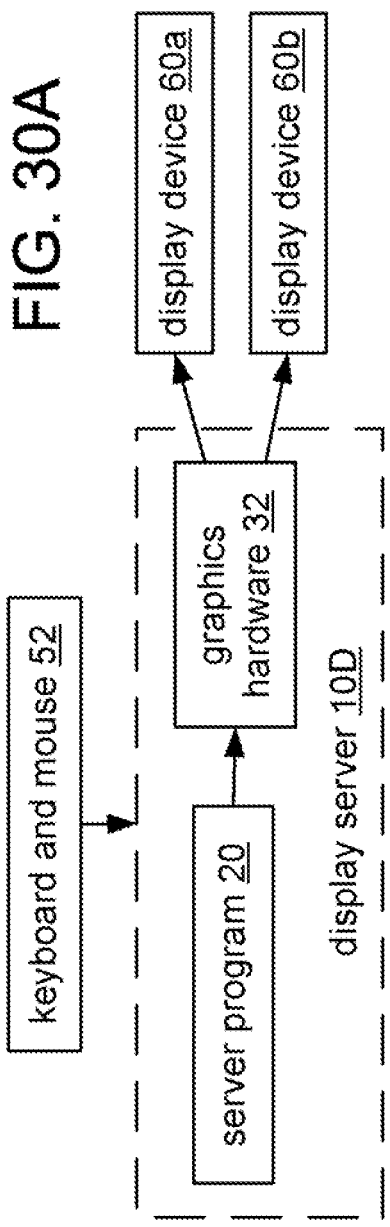
FIG. 30A shows a block diagram of a dual-head implementation 10D of display server 10.
Figure 30B:
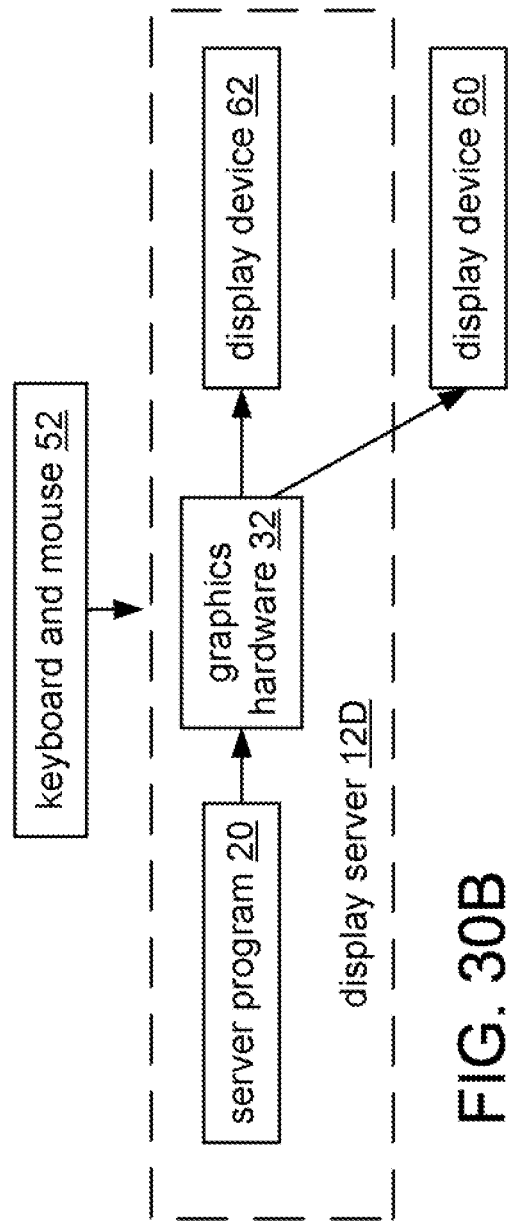
FIG. 30B shows a block diagram of a dual-head implementation 12D of display server 12.

Graphics hardware supporting dual-head displays is commonly available. For example, such hardware may be obtained in the form of an expansion card or integrated chipset having two display outputs (e.g., SVGA and/or DVI), each capable of providing a different image from the other. FIG. 30A shows an example of a system including an implementation 10D of display server 10, where display server 10D includes an implementation 32 of graphics hardware 30 having dual-head capability. FIG. 30B shows an example of a system in which the display server has an integrated display device 62. In this particular example, a dual-head implementation 12D of display server 12 outputs a signal to a second display device 60 (e.g. via an analog or digital video connection). For example, display device 62 may be a high-resolution display, and a lower-resolution signal may be output to display device 60. The two video signals may correspond to the same client or to different clients. The Isona™ display station is one example of a superior display server that supports connection to a low-resolution display device for dual-head display.

What is claimed is:

1. A display server comprising:
graphics hardware configured to store an image to a display buffer; and
a computer-readable medium comprising:
first code for execution by at least one computer of the display server to produce, based on a plurality of drawing requests, a first plurality of rendering commands; and
second code for execution by at least one computer of the display server to generate a request to create a window in the image and to produce a second plurality of rendering commands,
wherein said image includes (A) a first plurality of pixels based on the first plurality of rendering commands and (B) a second plurality of pixels based on the second plurality of rendering commands,
wherein said first code is configured to produce, in response to said request to create a window, a label identifying the window, and
wherein said second code is configured to produce the second plurality of rendering commands based on said label such that the second plurality of pixels is within the created window, and
wherein the computer-readable medium comprises third code for execution by at least one computer of the display server:
to retrieve, based on said label and at a first time, a first representation of the second plurality of pixels from the display buffer;
to retrieve from the display buffer, based on said label and at a second time that is subsequent to the first time, a second representation of pixels within the created window;
to compare pixels of the second representation to corresponding pixels of the first representation to produce a compressed representation of the second plurality of pixels; and
to record, to nonvolatile storage, the plurality of drawing requests and the compressed representation.

2. The display server according to claim 1, wherein said display server comprises code for causing at least one computer of the display server to output the second plurality of rendering commands based on a plurality of drawing commands that are compliant with at least one standard version of the OpenGL application programming interface.

3. The display server according to claim 1, wherein said first code is included within a server program that is configured to receive said plurality of drawing requests from at least one client, and
wherein said third code is configured to be dynamically loaded as an extension to the server program.

4. The display server according to claim 1, wherein said medium includes code for execution by at least one computer of the display server to record, to nonvolatile storage, a value of each of a plurality of internal variables of said first code, and
wherein the values of the plurality of internal variables control a relation between the plurality of drawing requests and the first plurality of rendering commands.

5. The display server according to claim 4, wherein said code for execution by at least one computer of the display server to record a value of each of a plurality of internal variables is configured to record, for each of a plurality of time intervals, a corresponding set of values of internal variables of said first code during the corresponding time interval, and
wherein said third code includes code for causing at least one computer of the display server to record, to the nonvolatile storage, drawing requests received during the plurality of time intervals, and
wherein said medium includes code for causing at least one computer of the display server to create an index file that stores a correspondence in time between said recorded sets of values and said recorded drawing requests over the plurality of time intervals.

6. The display server according to claim 1, wherein the graphics hardware is configured to output a display signal representing the image.

7. The display server according to claim 1, wherein said third code is configured to retrieve the representation in response to a command that includes said label.

8. The display server according to claim 7, wherein said computer-readable medium includes fourth code for execution by at least one computer of the display server to issue said command at regular intervals.

9. The display server according to claim 8, wherein said fourth code is a timer handler.

10. The display server according to claim 8, wherein said fourth code executes in response to an interrupt.

11. The display server according to claim 1, wherein said third code includes code for execution by at least one computer of the display server to retrieve from the display buffer, at each of a plurality of times, a corresponding representation of pixels within the created window, and
wherein said medium includes code for execution by at least one computer of the display server to create an index file that stores a correspondence in time between said retrieved representations and said recorded drawing requests.

12. The display server according to claim 1, wherein said graphics hardware is located at a node, and
wherein said first code and said second code are configured to execute at the node.

13. An apparatus for recording, said apparatus comprising:
graphics hardware configured to store an image to a display buffer;
means for producing, based on a plurality of drawing requests, a first plurality of rendering commands;
means for generating a request to create a window in the image and for producing a second plurality of rendering commands; and
means for recording the plurality of drawing requests,
wherein said image includes (A) a first plurality of pixels based on the first plurality of rendering commands and (B) a second plurality of pixels based on the second plurality of rendering commands, and
wherein said means for producing the first plurality of rendering commands is configured to produce, in response to said request to create a window, a label identifying the window, and
wherein said means for producing the second plurality of rendering commands is configured to produce the second plurality of rendering commands based on said label such that the second plurality of pixels is within the created window, and wherein said means for recording is configured:
- to retrieve, based on said label and at a first time, a representation of the second plurality of pixels from the display buffer;
- to retrieve from the display buffer, based on said label and at a second time that is subsequent to the first time, a second representation of pixels within the created window;
- to compare pixels of the second representation to corresponding pixels of the first representation to produce a compressed representation of the second plurality of pixels; and
- to record, to nonvolatile storage, the plurality of drawing requests and the compressed representation.

14. The apparatus according to claim 13, wherein each of the plurality of drawing requests is compliant with at least one standard version of the X Window System Protocol.

15. The apparatus according to claim 13, wherein said means for recording the plurality of drawing requests is configured to record, to the nonvolatile storage, a value of each of a plurality of internal variables of said means for producing a first plurality of rendering commands, and wherein the values of the plurality of internal variables control a relation between the plurality of drawing requests and the first plurality of rendering commands.

16. The apparatus according to claim 13, wherein said means for recording is configured to retrieve the representation in response to a command that includes said label.

17. The apparatus according to claim 16, wherein said apparatus includes means for issuing said command at regular intervals.

18. The apparatus according to claim 17, wherein said means for issuing is configured to issue said command in response to an interrupt.

19. The display server according to claim 13, wherein said graphics hardware is located at a node, and wherein said means for producing the first plurality of rendering commands and said means for producing the second plurality of rendering commands are located at the node.

* * * * *

UNITED STATES PATENT AND TRADEMARK OFFICE
CERTIFICATE OF CORRECTION

PATENT NO.          : 8,878,833 B2                                           Page 1 of 1
APPLICATION NO.     : 11/838791
DATED               : November 4, 2014
INVENTOR(S)         : Rick De Laet It is certified that error appears in the above-identified patent and that said Letters Patent is hereby corrected as shown below:

In the Claims

Column 38, Line 16, Claim 19: change "The display server according to claim 13" to
--The apparatus according to claim 13--.

Signed and Sealed this
Seventeenth Day of March, 2015

Michelle K. Lee
*Director of the United States Patent and Trademark Office*